(12) United States Patent
Boggs et al.

(10) Patent No.: US 12,136,234 B2
(45) Date of Patent: Nov. 5, 2024

(54) VISION-BASED NAVIGATION SYSTEM INCORPORATING MODEL-BASED CORRESPONDENCE DETERMINATION WITH HIGH-CONFIDENCE AMBIGUITY IDENTIFICATION

(71) Applicant: Rockwell Collins, Inc., Cedar Rapids, IA (US)

(72) Inventors: Christopher M. Boggs, Gainesville, VA (US); Robert B. Anderson, Sterling, VA (US); Weston J. Lahr, Sherwood, OR (US); Richard M. Rademaker, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 383 days.

(21) Appl. No.: 17/573,283

(22) Filed: Jan. 11, 2022

(65) Prior Publication Data
US 2023/0222684 A1 Jul. 13, 2023

(51) Int. Cl.
G06V 10/24 (2022.01)
G06T 7/73 (2017.01)
G06V 20/17 (2022.01)

(52) U.S. Cl.
CPC .............. *G06T 7/73* (2017.01); *G06V 10/24* (2022.01); *G06V 20/17* (2022.01); *G06T 2207/10032* (2013.01); *G06T 2207/30244* (2013.01)

(58) Field of Classification Search
CPC .................................. G06T 7/73; G06V 20/01
See application file for complete search history.

(56) References Cited

U.S. PATENT DOCUMENTS 5,645,077 A  7/1997 Foxlin
5,812,257 A  9/1998 Teitel et al.
(Continued)

FOREIGN PATENT DOCUMENTS

CA  3058955 C  5/2022
EP  1203285 A1  5/2002
(Continued)

OTHER PUBLICATIONS

U.S. Appl. No. 17/573,283, filed Jan. 11, 2022, Boggs et al.
(Continued)

*Primary Examiner* — Sam Bhattacharya
(74) *Attorney, Agent, or Firm* — Suiter Swantz IP

(57) ABSTRACT

A vision-based navigation system (e.g., for aircraft on approach to a runway) captures via camera 2D images of the runway environment in an image plane. The vision-based navigation system stores a constellation database of runway features and their nominal 3D position information in a constellation plane. Image processors detect within the captured images 2D features potentially corresponding to the constellation features. The vision-based navigation system estimates optical pose of the camera in the constellation plane by aligning the image plane and constellation plane into a common domain, e.g., via orthocorrection of detected image features into the constellation plane or reprojection of constellation features into the image plane. Based on the common-domain plane, the vision-based navigational system generates candidate correspondence maps (CMAP) of constellation features mapped to the image features with high-confidence error bounding, from which optical pose of the camera or aircraft can be estimated.

18 Claims, 12 Drawing Sheets

(56) References Cited

U.S. PATENT DOCUMENTS

| | | | |
|---|---|---|---|
| 6,162,191 A | 12/2000 | Foxlin | |
| 6,176,837 B1 | 1/2001 | Foxlin | |
| 6,311,129 B1 | 10/2001 | Lin | |
| 6,361,507 B1 | 3/2002 | Foxlin | |
| 6,377,401 B1 | 4/2002 | Bartlett | |
| 6,408,245 B1 | 6/2002 | An et al. | |
| 6,409,687 B1 | 6/2002 | Foxlin | |
| 6,449,559 B2 | 9/2002 | Lin | |
| 6,474,159 B1 | 11/2002 | Foxlin et al. | |
| 6,480,152 B2 | 11/2002 | Lin et al. | |
| 6,658,354 B2 | 12/2003 | Lin | |
| 6,681,629 B2 | 1/2004 | Foxlin et al. | |
| 6,738,714 B2 | 5/2004 | McCall et al. | |
| 6,786,877 B2 | 9/2004 | Foxlin | |
| 6,820,025 B2 | 11/2004 | Bachmann et al. | |
| 7,000,469 B2 | 2/2006 | Foxlin et al. | |
| 7,046,215 B1 | 5/2006 | Bartlett | |
| 7,266,446 B1 | 9/2007 | Pelosi | |
| 7,301,648 B2 | 11/2007 | Foxlin | |
| 7,395,181 B2 | 7/2008 | Foxlin | |
| 7,409,290 B2 | 8/2008 | Lin | |
| 7,640,106 B1 | 12/2009 | Stokar et al. | |
| 7,672,781 B2 | 3/2010 | Churchill et al. | |
| 8,019,538 B2 | 9/2011 | Soehren et al. | |
| 8,165,844 B2 | 4/2012 | Luinge et al. | |
| 8,953,154 B2 | 2/2015 | Galea et al. | |
| 8,965,736 B2 | 2/2015 | Horton et al. | |
| 9,031,809 B1 | 5/2015 | Kumar et al. | |
| 9,478,141 B2 | 10/2016 | Revell et al. | |
| 9,569,668 B2 | 2/2017 | Schertler | |
| 9,779,550 B2 | 10/2017 | Tobita | |
| 9,891,705 B1 | 2/2018 | Lahr et al. | |
| 10,216,265 B1 | 2/2019 | Kirchner et al. | |
| 10,597,168 B2 | 3/2020 | Boada-Bauxell et al. | |
| 10,664,989 B1 | 5/2020 | Goslin et al. | |
| 10,775,881 B1 | 9/2020 | Lahr et al. | |
| 10,909,715 B1 | 2/2021 | Boggs et al. | |
| 11,036,453 B1 | 6/2021 | Jarrett et al. | |
| 11,055,875 B2 | 7/2021 | Cramblitt | |
| 11,320,650 B1 | 5/2022 | Tiana et al. | |
| 11,354,815 B2 | 6/2022 | Suzuki et al. | |
| 11,354,868 B1 | 6/2022 | Judd et al. | |
| 11,360,552 B1 | 6/2022 | Tiana | |
| 11,365,974 B2 | 6/2022 | Mendez et al. | |
| 11,880,034 B2 | 1/2024 | Tiana et al. | |
| 11,914,763 B1 | 2/2024 | Boggs et al. | |
| 2004/0149036 A1 | 8/2004 | Foxlin et al. | |
| 2010/0039294 A1 | 2/2010 | Feyereisen et al. | |
| 2010/0045701 A1 | 2/2010 | Scott et al. | |
| 2013/0234850 A1 | 9/2013 | Lee et al. | |
| 2013/0237811 A1 | 9/2013 | Mihailescu et al. | |
| 2014/0212000 A1 | 7/2014 | Yagcioglu et al. | |
| 2015/0317838 A1 | 11/2015 | Foxlin | |
| 2015/0332153 A1 | 11/2015 | Bourdis et al. | |
| 2016/0148045 A1 | 5/2016 | Bicer et al. | |
| 2017/0358131 A1 | 12/2017 | Weiss et al. | |
| 2019/0041980 A1 | 2/2019 | Trythall et al. | |
| 2019/0196198 A1 | 6/2019 | Aymeric et al. | |
| 2020/0005448 A1 | 1/2020 | Subramanian et al. | |
| 2021/0319709 A1 | 10/2021 | Rose et al. | |
| 2022/0050290 A1 | 2/2022 | Fortin-Deschênes et al. | |
| 2023/0100979 A1 | 3/2023 | Wan et al. | |
| 2023/0110716 A1 | 4/2023 | Fletcher et al. | |
| 2023/0222689 A1 | 7/2023 | Boggs et al. | |

FOREIGN PATENT DOCUMENTS

| | | |
|---|---|---|
| EP | 1157326 B1 | 10/2002 |
| EP | 2201532 B1 | 2/2012 |
| EP | 3690734 A1 | 8/2020 |
| EP | 3668792 A4 | 8/2021 |
| EP | 3864491 A1 | 8/2021 |
| WO | 2017042578 A1 | 3/2017 |

OTHER PUBLICATIONS

Alcantara, et al., (2011). Alternative Position, Orientation and Data Recognition Algorithms for Augmented Reality Markers. Retrieved at https://www.researchgate.net/publication/267246987_ALTERNATIVE_POSITION_ORIENTATION_AND_DATA_RECOGNITION_ALGORITHMS_FOR_AUGMENTED_REALITY_MARKERS.

Cai, Xingcheng. A Prototype Helmet Fitting System for Concussion Protection. Diss. M. Sc. thesis, School of Computing, Queen's University, Kingston, Ontario, Canada, 2015. (Year:2015).

Extended European Search Report dated May 10, 2023; European Application No. 23151205.4.

Extended Search Report in European Application No. 181870114 dated Jan. 7, 2019, 10 pages.

Ferrin F J: "Survey of Helmet Tracking Technologies", Visual Communications and Image Processing; Jan. 20, 2004-Jan. 20, 2004; San Jose, vol. 1456, Feb. 26, 1991 (Feb. 26, 1991), pp. 86-94, XP000578495, DOI: 10.1117/12.45422, ISBN: 978-1-62841-730-2.

Chatterji, G.B. et al: "GPS/machine vision navigation system for aircraft", IEEE Transactions on Aerospace and Electronic Systems, IEEE Service Center, Piscataway, NJ, US, vol. 33, No. 3, Jul. 1, 1997, pp. 1012-1025.

Extended European Search Report dated Jun. 16, 2023; European Application No. 23150030.7.

Pieniazek, Jacek: "Measurement of aircraft approach using airfield image", Measurement, vol. 141, Jul. 1, 2019, pp. 396-406.

Tonhuser, Christian et al: "Integrity Concept for Image-Based Automated Landing Systems", PNT 2015—Proceedings of the ION 2015 Pacific PNT Meeting, The Institute of Navigation, 8551 Rixlew Lane, Suite 360, Manassas, VA 20109, USA, Apr. 23, 2015, pp. 733-747.

Calhoun, Sean M. et al: "Integrity determination for a vision based precision relative navigation system", 2016 IEEE/ION Position, Location and Navigation Symposium (Plans), IEEE, Apr. 11, 2016, pp. 294-304.

Extended European Search Report dated Jun. 22, 2023; European Application No. 23150358.2.

Frisch Gabriel et al: "High Integrity Lane Level Localization Using Multiple Lane Markings Detection and Horizontal Protection Levels", 2018 15th International Conference on Control, Automation, Robotics and Vision (ICARCV), IEEE, Nov. 18, 2018, pp. 1496-1501.

Hecker P. et al: "Optical Aircraft Positioning for Monitoring of the Integrated Navigation System during Landing Approach", Gyroscopy and Navigation, Pleiades Publishing, Moscow, vol. 10, No. 4, Oct. 1, 2019, pp. 216-230.

Extended European Search Report dated May 12, 2023; European Application No. 23150052.1.

VISION-BASED NAVIGATION SYSTEM INCORPORATING MODEL-BASED CORRESPONDENCE DETERMINATION WITH HIGH-CONFIDENCE AMBIGUITY IDENTIFICATION

BACKGROUND

Optical pose estimation is used increasingly in avionics applications such as vision-based relative navigation for platform-based terminal guidance and formation flying. Computer vision-based solutions are attractive because they offer low SWaP-C and availability when other sensor modalities are not available (e.g., GPS, Radio, magnetometer). For example, model-based pose estimation attempts to determine an optical pose (e.g., position and orientation) of the camera relative to a target environment. For vision-based navigation systems, the target environment may be a runway to which an aircraft may be on approach, the runway surrounded by lighting infrastructure arranged in such a way as to provide navigational information. An external camera may be fixed to the aircraft in a known orientation, and capture images of the three-dimensional target environment. The pose estimate may be based on a detailed comparison of the two-dimensional (2D) images with the three-dimensional (3D) features, e.g., approach/runway lighting structures or runway markings, depicted thereby; these "constellation features" or constellation features, depicted thereby: e.g., runway lighting structures.

In order for safety-critical applications to apply optical pose, however, pose estimates must incorporate reliable overbounds of any errors in the pose estimate. A reliable correspondence map (CMAP), via which features observed and detected in the camera image are mapped to the real-world runway features the images purport to depict, may be sufficient for a reliable, high-confidence pose error bound, ensuring a reliable CMAP may not be straightforward, e.g., in the absence of an accurate optical pose. For example, if the optical pose is not known, the lack of information about projective and geometric relationships between the 3D features and the 2D images make straightforward comparison of the image and constellation features impractical if not impossible, requiring the determination and assessment of candidate CMAPs (and associated candidate optical poses) which may be assessed for reasonableness via residual monitoring. However, a large set of candidate CMAPs may preclude precise, high confidence error bounding of candidate pose estimates. For example, loosening residual monitoring thresholds may result in an erroneous or infeasible CMAP (which may incorporate spurious or missed features) being found valid. Further, a broad scope of candidate pose solutions broadens the associated error bounds, which may in turn affect availability if a pose estimate associated with an erroneous or infeasible CMAP is unsuitable for target guidance applications. Alternatively, tightening residual monitoring thresholds may create an integrity issue by discarding a valid CMAP and pose estimate in favor of an inferior solution that may lead to failure to overbound pose error.

Model-based pose estimation may use the inherent constraints of physical modeling to determine a pose based on a given set of correspondences between 2D features detected within a captured image and 3D constellation features. However, these systems assume the pose estimate associated with a set of correspondences (e.g., a set associated with low residuals) is correct, rather than applying physical modeling to determine candidate correspondences or identify correspondence ambiguities. When searching for all feasible candidate correspondences between 2D image features and 3D constellation features, neglecting physical model constraints may require assessment of a set of candidates that may grow exponentially as the number of relevant features increases, to a computationally infeasible size. Random sampling approaches may attempt to alleviate this problem, but at the risk of missing or throwing out feasible correspondences that may still be correct; this may lead to a loss of system integrity or, at worst, the display of hazardously misleading information (HMI). Further, the selection of a single pose may overlook the issue of ambiguous candidate correspondences or involve the selection of an incorrect correspondence, which similarly may lead to a failure of system integrity.

Alternative approaches may estimate pose via machine learning (ML) algorithms. However, these approaches similarly forgo model-based constraints in favor of training ML algorithms according to a limited dataset, which in turn introduces an unobservable sampling bias. ML algorithm-based pose estimation additionally fails to provide a clear path to the high-confidence error bounding required by safety-critical applications.

Additional challenges may be associated with conventional approaches that attempt to determine a set of correspondences by trying a large number of possible combinations, commonly using pseudorandom approaches. For example, these approaches may provide high availability but result in individual solutions of limited confidence. Further, the feature sets involved may be large sets of relatively indistinct low-information features (e.g., point features which may correspond to a single runway light). Consequently, there is a high likelihood of both spurious features (e.g., features detected within a captured image that cannot provide a valid correspondence to any constellation feature) and missed features (constellation features located within the field of view of the camera that are not detected within the captured image).

SUMMARY

In a first aspect, a vision-based navigation system is disclosed. In embodiments, the vision-based navigation system includes cameras for capturing two-dimensional (2D) images of a runway environment or other target environment, the images corresponding to an image plane or frame. The system includes memory or data storage for storing a constellation database of constellation features, e.g., runway lighting structures and other runway features associated with the runway environment, each constellation feature having a nominal three-dimensional (3D) position with respect to a constellation plane or frame. The system includes processors configured (e.g., via executable code) to detect within the captured images 2D image features. As the exact pose of the camera relative to the constellation plane is not known, the 2D image features and 3D constellation features are aligned into a common domain (e.g., either the image plane or the constellation plane) so a candidate correspondence map (CMAP), or set of candidate correspondences may be determined, e.g., which constellation features correspond to which image features, the candidate CMAP associated with an error bound.

In some embodiments, the vision-based navigation system determines, based on the candidate CMAP, a candidate estimate of the pose of the camera relative to the constellation plane.

In some embodiments, the candidate CMAP is associated with a desired confidence level for each candidate correspondence. For example, the candidate CMAP may include unambiguous correspondences between image features and constellation features that meet or exceed the desired confidence level, and correspondence ambiguities where feasible correspondences may occur between image features and constellation features, but these correspondences may not meet the desired confidence level.

In some embodiments, the vision-based navigation system aligns the image features and constellation features into a common domain based on one or more auxiliary inputs and their associated error bounds. For example, additional error bounds may be associated with one or more of the desired confidence level, the detected image features, the constellation features, auxiliary error models associated with auxiliary inputs, or prior pose estimates (e.g., propagated forward in time or used for iterative operations to improve orientation accuracy or eliminate correspondence ambiguities).

In some embodiments, auxiliary inputs and their associated error models include, but are not limited to: heading angle and/or yaw error; the planarity (or lack thereof) of the constellation features; a camera model via which the camera is mounted to the aircraft; a feature pixel error associated with the detected image features; or a sensor alignment model associated with one or more additional sensors in communication with the vision-based navigation system.

In some embodiments, the vision-based navigation system receives an orientation estimate, e.g., from an aircraft-based inertial reference system. For example, the orientation estimate may be an estimate of the orientation of the image plane relative to the constellation plane in at least two degrees of freedom (2DoF). Based on the external orientation estimate, the vision-based navigation system aligns the image plane and the constellation plane into the common domain by orthocorrection transformation of the detected image features from the image plane into the constellation plane, where the orthocorrected features and constellation features are ideally related by an approximate similarity transform.

In some embodiments, the vision-based navigation system is aircraft-based (e.g., to navigate the aircraft through an approach to, and landing at, a runway) and the orientation estimate includes an estimate of the pitch angle and roll angle of the aircraft accounting for a mounting orientation of the camera relative to the aircraft frame.

In some embodiments, the vision-based navigation system receives a pose estimate in at least six degrees of freedom (6DoF) of the pose of the camera relative to the constellation plane. For example, the vision-based navigation system aligns the image plane and the constellation plane into the common domain via reprojection of the constellation features into the image plane based on the 6DoF pose estimate.

In some embodiments, the vision-based navigation system detects image features from within the captured images by first detecting lower-level image features directly (e.g., point-based or line-based features, edges, corners) and constructing a hierarchy of higher-level image features, wherein each top-level higher-level image feature comprises a collection of lower-level and-or higher-level image features and a geometric relationship by which the lower-level and higher-level features are defined as components of the top-level higher-level image feature.

In some embodiments, the vision-based navigation system constructs top-level higher-level image features by determining intermediate pose estimates (e.g., estimates of the camera pose relative to the constellation plane) based on the geometric relationship.

In a further aspect, a method for model-based correspondence determination with high-confidence ambiguity identification via a vision-based navigation system is also disclosed. In embodiments, the method includes receiving one or more images captured by an aircraft-based camera, the two-dimensional (2D) images depicting a runway environment or other target environment relative to an image plane. The method includes providing, via memory or other like data storage, a constellation database of constellation features, e.g., runway lighting structures and other runway features associated with the runway environment, each constellation feature associated with a nominal three-dimensional (3D) position relative to a constellation plane. The method includes detecting within the captured images 2D image features, each image feature having a 2D position relative to the image plane. The method includes aligning the 2D image features and the 3D constellation features (e.g., and their respective planes) into a common domain. The method includes determining, by comparing the common-domain image features and constellation features, a candidate correspondence map (CMAP) including a set of correspondences between one or more image features and one or more constellation features.

In some embodiments, the method includes detecting lower-level image features within the captured images and constructing a hierarchy of higher-level image features, wherein each higher-level image feature includes a set of component lower-level and higher-level features (e.g., of a lower degree or level) and a geometric relationship via which the component features are defined as a higher-level image feature.

In some embodiments, the method includes receiving, from an aircraft-based inertial reference system (IRS), an aircraft orientation estimate (e.g., pitch angle, roll angle, camera mounting orientation) and, based on the orientation estimate, aligning the image plane and the constellation plane into the common domain via orthocorrection transformation of the detected image features into the constellation plane.

In some embodiments, the method includes receiving from an IRS a pose estimate of the camera pose relative to the constellation plane in at least six degrees of freedom (6DoF) and, based on the 6DoF pose estimate, aligning the image plane and the constellation plane by reprojecting the constellation features into the image plane.

In some embodiments, the method includes determining a candidate CMAP associated with a desired confidence level, where the unambiguous correspondences between image features (e.g., or orthocorrections thereof) and constellation features (e.g., or reprojections thereof) meet or exceed the desired confidence level and the correspondence ambiguities, e.g., ambiguous correspondences between an image feature and two or more constellation features, do not meet the desired confidence level.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
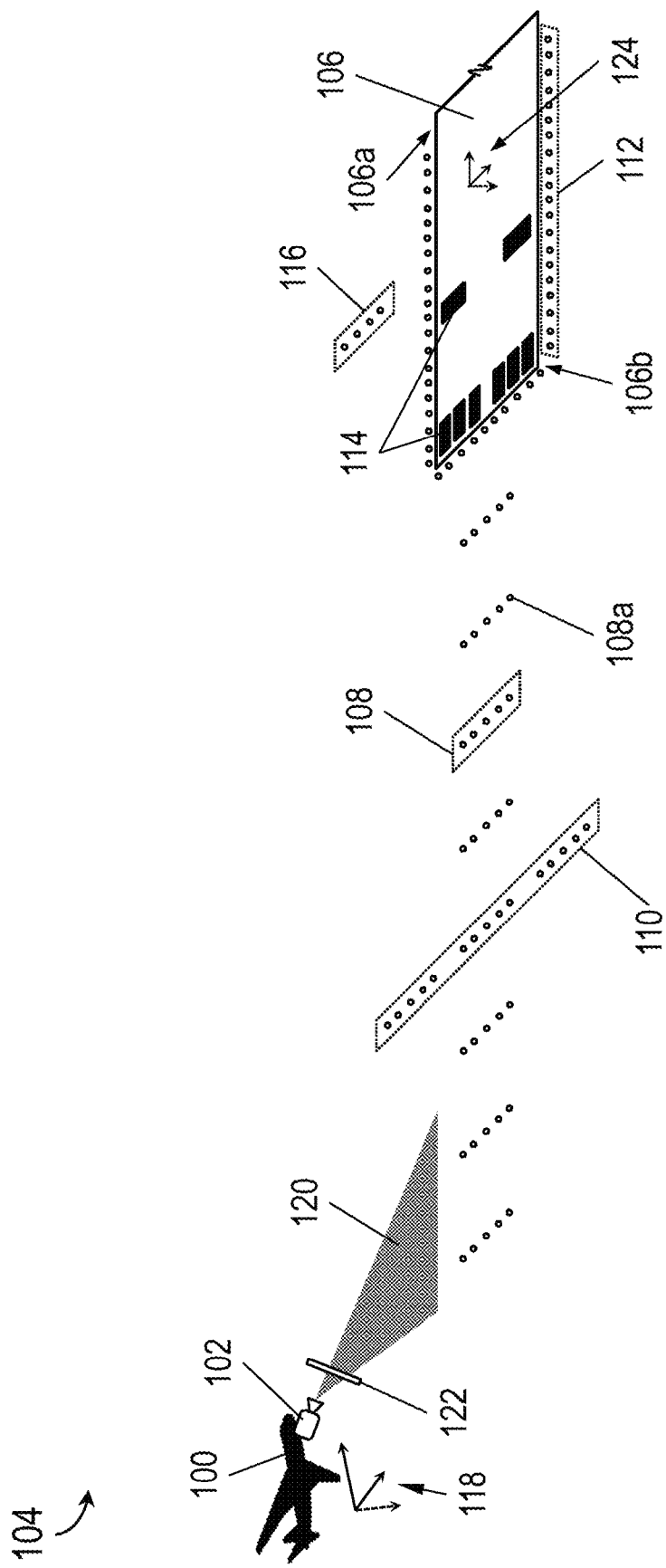
FIG. 1 is a diagrammatic illustration of an aircraft on approach to a runway environment, the aircraft incorporating a vision-based navigation system according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a vision-based navigation system and method capable of high-confidence image-to-world correspondence enabling a high-confidence estimate of a camera (e.g., or aircraft) pose relative to a target environment, e.g., a runway to which the aircraft is on approach. For example, captured images of the target environment may be orthocorrected according to an a priori orientation estimate, such that the relationship between image reference frame and environment reference frame reduces approximately to a similarity transform, allowing for more accurate detection of environmental elements corresponding to detected image features. Further, the orthocorrected image features may be bounded by an error bound on the orientation estimate, allowing for identification of correspondence ambiguities between image features and environmental features. Finally, as orientation accuracy is improved, the target region within a captured image may be adjusted; e.g., reducing ambiguity within a region or growing the region without increased ambiguity.

In addition, the complexity and necessary combinations involved in matching image elements to their corresponding world features may be significantly reduced by focusing image processing on lower-level features and constructing higher-level features based on geometric relationships between detected lower-level features. Complex higher-level features provide for fewer combinations of high-information features, reduce the likelihood of spurious or missing features, and allow for more accurate ambiguity tracking.

Referring to FIG. 1, an aircraft 100 is disclosed. The aircraft may incorporate an onboard camera 102 and may be traversing a runway environment 104 on approach to a runway 106. The runway environment 104 may further include, in addition to the runway 106, runway features including, but not limited to: runway approach lightbars 108 (including individual lighting elements 108a), runway approach crossbars 110, runway edge lighting 112, runway markings 114, and/or indicator lighting 116, e.g., precision approach path indicator (PAPI) lighting, visual approach slope indicator (VASI) lighting, and other lighting configured to provide approach guidance information to the aircraft 100.

In embodiments, the camera 102 may be mounted to the aircraft 100 according to a known camera model. For example, the camera 102 may be mounted to the aircraft 100 at a fixed orientation relative to the platform frame 118, e.g., a frame of reference corresponding to the aircraft 100. In some embodiments the camera 102 may be capable of movement relative to the aircraft 100, such that the camera model accounts for relative optical position and orientation (optical pose) of the camera relative to the aircraft and/or the platform frame 118. In embodiments, the camera 102 may capture images (e.g., streaming images) of the runway environment 104 within the frustum 120 of the camera. For example, captured images may provide two-dimensional (2D) visual information corresponding to the runway environment 104 relative to an image frame 122, e.g., wherein the image corresponds to a 2D pixel array (x*y) and wherein pixel subsets of the image may depict the runway 106 and/or runway features, or portions thereof as seen by the camera 102 in the image frame.

In embodiments, each runway feature ("constellation features", e.g., runway approach lightbars 108, individual lighting elements 108a, runway approach crossbars 110, runway edge lighting 112, runway markings 114, and/or indicator lighting 116), in addition to aspects of the runway 106 itself (e.g., runway edges 106a, runway corners 106b) may be associated with a fixed nominal three-dimensional (3D) position relative to a constellation plane 124 (e.g., constellation frame, runway reference frame, usually with a known relation to a local-level navigation frame).

Figure 2:
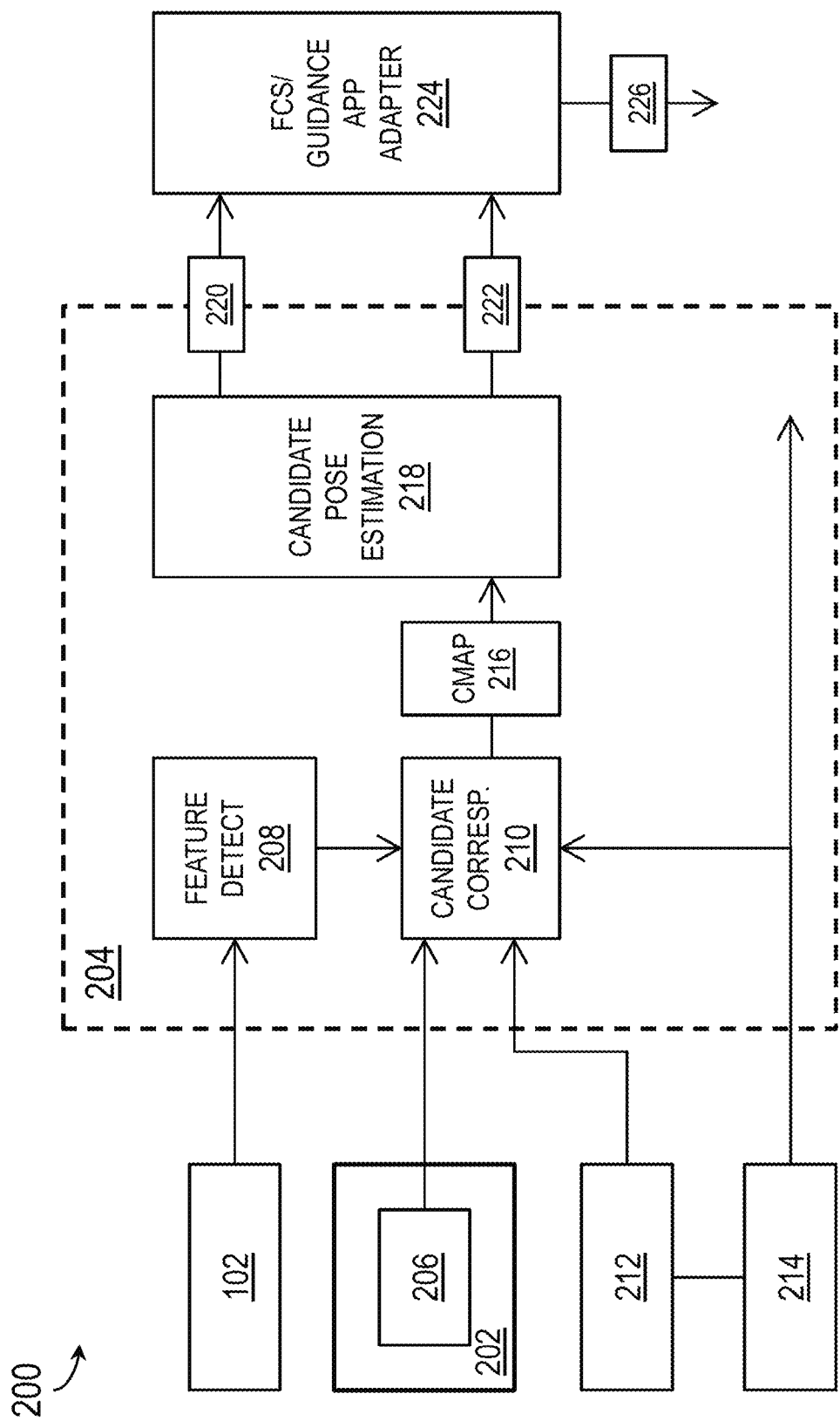
FIG. 2 is a block diagram of the vision-based navigation system of FIG. 1.

Referring now to FIG. 2, a vision-based navigation system 200 is disclosed.

The vision-based navigation system 200 may be embodied aboard the aircraft (100, FIG. 1) and may include the camera 102, memory 202 or any other appropriate data storage means as is known, and processors 204 (e.g., one or more processors, including cores, partitions, or other virtualized portions thereof). The memory 202 may include encoded instructions executable by the processors 204 as well as a constellation database 206 corresponding to the runway environment (104, FIG. 1).

In embodiments, for each runway environment 104, a corresponding constellation database 206 may include 3D position information in the constellation plane (124, FIG. 1) for each constellation feature (e.g., "runway features" including, but not limited to: runway approach lightbars (108, FIG. 1), individual lighting elements (108a, FIG. 1), runway approach crossbars (110, FIG. 1), runway edge lighting (112, FIG. 1), runway markings (114, FIG. 1), and/or indicator lighting (116, FIG. 1)).

In embodiments, image processing and feature detection 208 may receive and analyze images captured by the camera 102 to detect image features corresponding to the runway features. For example, image processing/feature detection 208 may detect points, edges, corners, light areas, dark areas, and/or other portions of an image. Each image portion may be associated with an array or group of pixels having a position relative to the image frame (122, FIG. 1) and potentially indicative of one or more runway features (e.g., based on shape, luminous intensity, position or angle relative to other image portions, and/or other relative factors).

In embodiments, high-confidence candidate correspondence determination modules 210 may receive the detected image features and may access the constellation database 206 in order to determine correspondences between the detected image features 208 and the real-world constellation features portrayed by the captured images. For example, the candidate correspondence determination modules 210 may align the image plane 122 and the constellation plane 124 into a common domain based on one or more orthocorrection inputs 212 (and the error models 214 and/or error bounds associated with these orthocorrection inputs).

In embodiments, when the orientation between the image plane 122 and constellation plane 124 is thus resolved into a common domain, the relationship between a 3D constellation point or feature in the constellation plane and a corresponding point or feature in the 2D image is a similarity transformation. For example, image patterns and constellation patterns may be identical except for changes in scale, in-plane shifts, and in-plane rotations. Relative distance and angles, however, may be invariant between image patterns and constellation patterns, and may be used to match constellation patterns to image patterns within relatively tight tolerances. Similarly, the estimated orientation between the image plane 122 and constellation plane 124 may be error-bounded with high confidence based on the error models 214 or error bounds associated with the orthocorrection inputs 212.

In embodiments, the candidate correspondence determination modules 210 may attempt to match constellation features to image features 208, resulting in a candidate correspondence map 216 (CMAP), e.g., a set of candidate correspondences between image and constellation features. For example, under ideal conditions the candidate CMAP 216 may map each image feature (e.g., or a group thereof) to a corresponding constellation feature/s to a desired confidence level; the higher the confidence level, the lower the likelihood of correspondence ambiguity. However, in some embodiments a candidate CMAP 216 may include correspondence ambiguities. For example, two or more image features 208 may be detected sufficiently proximate to a constellation feature that while it may be likely (e.g., to the desired confidence level) that either of the image features corresponds to the constellation feature, it cannot be determined to the desired confidence level which image feature corresponds to the constellation feature.

In embodiments, the vision-based navigation system 200 may estimate (218) the optical pose of the camera 102 relative to the constellation plane 124 based on the candidate CMAP 216. For example, a candidate pose estimate 220 (e.g., an estimate in at least six degrees of freedom (6DoF) of the optical pose of the camera in the constellation plane) having a sufficiently high-confidence error bound 222 may be forwarded to application adapters 224 for use by flight control systems (FCS) or other flight guidance systems aboard the aircraft 100. If the high-confidence error bound 222 corresponds to sufficient accuracy of the candidate pose estimate 220, the application adapters 224 may transform the candidate pose estimate into lateral (LAT) deviations, vertical (VERT) deviations, or other guidance cues 226 to instruments and navigation systems aboard the aircraft 100.

In embodiments, the CMAP 216 may include correspondence ambiguities as described above. In order to preserve the integrity of the vision-based navigation system 200, a candidate pose estimate 218 based on the CMAP 216 must either exclude, or account for, correspondence ambiguities. High-confidence error bounding (222) of candidate pose estimates 220 based on CMAPs 216 including known correspondence ambiguities is disclosed by related application Ser. No. 17/685,032, which application is herein incorporated by reference in its entirety.

In embodiments, the candidate correspondence determination modules 210 of the vision-based navigation system 200 may align the image plane 122 and the constellation plane 124 in various ways as described in greater detail below. For example, the candidate correspondence determination modules 210 may orthocorrect detected image features 208 in the image plane 122 based on an orthocorrection input 212 comprising an orientation estimate of the aircraft 100, transforming the image features to orthoimages corresponding to a "virtual camera" having an image plane parallel to the constellation plane 124. Alternatively, given orthocorrection inputs 212 including a pose estimate in at least six degrees of freedom (6DoF), the candidate correspondence determination modules 210 may reproject constellation features into the image plane 122 by transforming the constellation features from the constellation plane 124 into the image plane.

Figure 3:
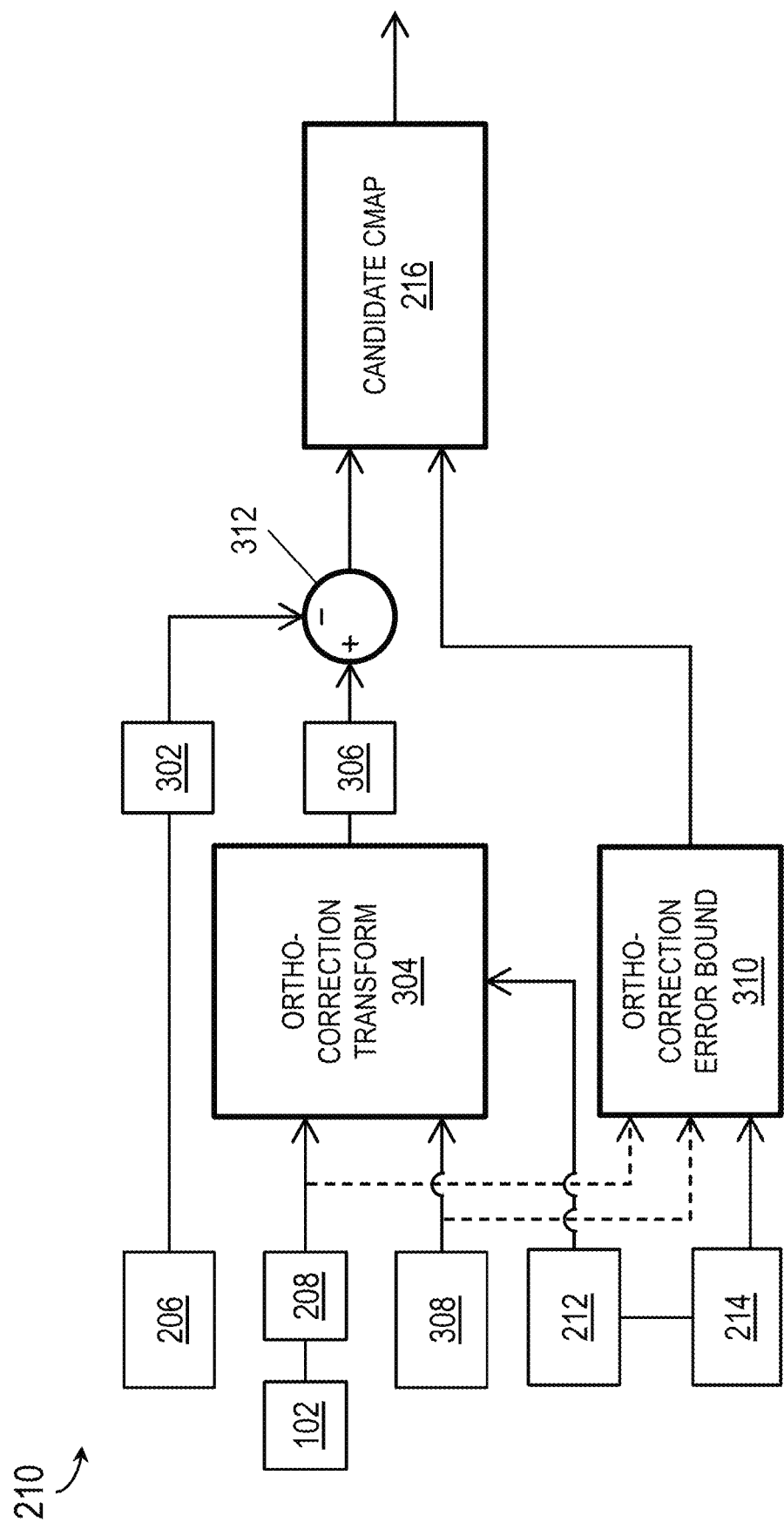
FIG. 3 is a block diagram of the vision-based navigation system of FIG. 1 determining a set of candidate correspondences via orthocorrection of captured images to align with a constellation plane.

Referring now to FIG. 3, the candidate correspondence determination modules 210 of the vision-based navigation system (200, FIG. 2) are shown.

In embodiments, the vision-based navigation system 200 may avoid extensive, time-consuming, and complex testing of random combinations of detected 2D image features 208 within images captured by the camera 102 and 3D constellation features 302 stored in the constellation database 206 by attempting to match known constellation features (e.g., and their nominal 3D positions relative to the constellation frame (124, FIG. 1)) to the detected image features within defined tolerances. For example, image processing/feature detection 208 may detect or identify points, edges, corners, and/or vertices of interest that may correspond to constellation features 302 or to components thereof. A distinct pattern of lights in a linear arrangement may be indicative of, e.g., runway approach lightbars (108, FIG. 1), runway approach crossbars (110, FIG. 1), runway edge lighting (112, FIG. 1), and/or indicator lighting (116, FIG. 1). Similarly, an arrangement of lines and angles may be indicative of the contours of a building.

The process of matching constellation features 302 to image features 208 is complicated by the lack of depth information provided by 2D images, and by the transform between the image plane (122, FIG. 1) and the constellation plane (124, FIG. 1), and therefore the camera pose relative to the constellation plane, being an unknown quantity. For example, if captured 2D images cannot provide information about changes in depth with the image, the relative distance and angles between detected image features 208 may vary throughout the image.

In embodiments, the vision-based navigation system 200 may more efficiently match corresponding constellation features 302 to detected image features 208 via orthoimage transformation (304; e.g., orthocorrection) of the detected 2D image features 208 from the image plane 122 to a "virtual camera" to determine orthocorrected 2D image features 306 having an image plane parallel to the constellation plane 124. For example, if the 3D constellation features 302 are substantially planar, the orthocorrected features 306 may correct for depth changes throughout the original 2D image, having a constant depth across the orthoimage and relating points in the orthoimage to coordinates in the constellation plane 124 via an approximate similarity transform.

In embodiments, both the 3D constellation features 304 and any inputs to the orthoimage transformation 304 (e.g., detected 2D image features 208, orientation estimate 308, auxiliary orthocorrection inputs 212) may be error-free, limiting any variation between orthocorrected features 306 and constellation features 302 to a similarity transform. However, due to errors in the constellation features 304 (e.g., variations in planarity) or in any inputs to the orthoimage transformation 304, the relation between orthocorrected features 306 and constellation features 302 may only approximate a similarity transform. In embodiments, given error bounds on the constellation features 302 and on inputs to the orthoimage transformation 306 (e.g., error bounds 214 on auxiliary orthocorrection inputs 212), an orthocorrection estimate 310 relative to an ideal (e.g., error-free) orthocorrection transformation 304 may be determined, the orthocorrection estimate serving as an error bound on the comparison (312) of orthocorrected features 306 and constellation features 302.

Accordingly, orthocorrected features 302 may be identical to the constellation features 302 except for changes in scale, in-plane shift, and in-plane rotation. Under the approximate similarity transform relating orthocorrected features 306 and constellation features 302, relative distances and angles between patterns or features may be invariant, enabling the detection of pattern matches (312) between orthocorrected features and the constellation features under tighter tolerances.

In embodiments, while the exact pose of the camera 102 relative to the constellation plane 124 may be unknown, the orientation between the image plane 122 and the constellation plane may be estimated within a high confidence error bound. For example, the aircraft 100 may incorporate inertial reference systems (IRS) with redundant hardware capable of generating an orientation estimate 308 of the aircraft within a high-confidence error bound. In embodiments, the orientation estimate 308 may be used for the orthocorrection transformation 304, the high-confidence error bound of the orientation estimate serving as an error bound for orthocorrected features of the orthoimage.

In embodiments, the vision-based navigation system 200 may compare (312) orthocorrected 2D image features 306 (and/or, e.g., orthocorrection residuals, or features representing the delta between the original 2D image features 208 and the orthocorrected features) to constellation features 302. For example, candidate correspondences between one or more orthocorrected features 306 and one or more constellation features 302 that meet or exceed a predetermined confidence level may be incorporated into a candidate correspondence map 216 (CMAP). In embodiments, orthocorrection error bounding 310 may account for the high-confidence error bound of the orientation estimate 308, in addition to any error bounds 214 associated with auxiliary orthocorrection inputs 212, to provide an error bound for the comparison (312) of orthocorrected features 306 and constellation features 302 (e.g., to the desired confidence level) and thereby determine if the CMAP 216 includes any ambiguous correspondences between the orthocorrected features and constellation features.

Figure 4:
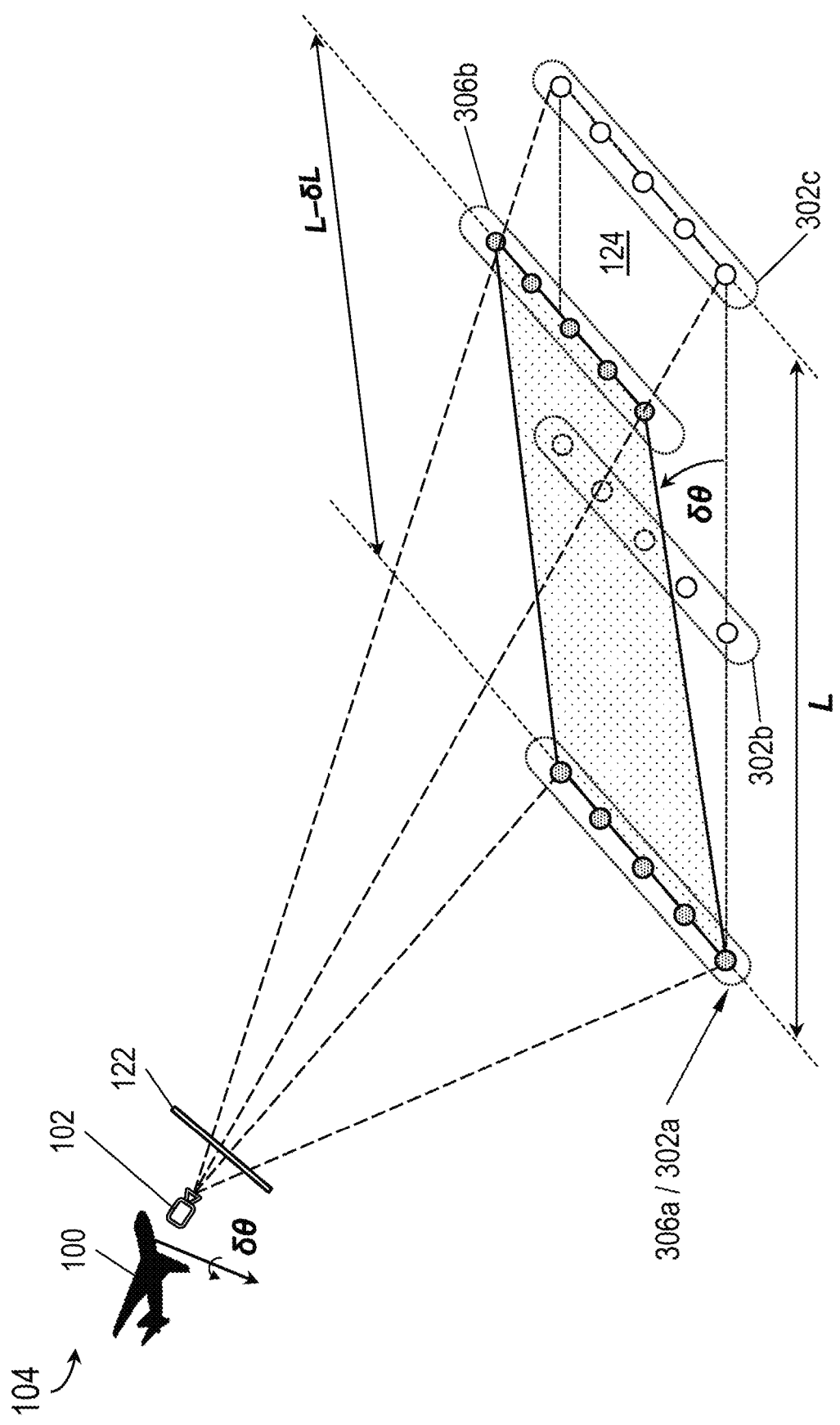
FIG. 4 is a diagrammatic illustration relating orthocorrection error models to correspondence ambiguities within the vision-based navigation system of FIG. 1.

Referring now to FIG. 4, the runway environment 104 is shown.

In embodiments, the orthocorrection transformation (304, FIG. 3) 2D image features 208 to orthocorrected features 306 may include, in addition to the orientation estimate (308, FIG. 3), auxiliary orthocorrection inputs (212, FIG. 3); errors in these auxiliary orthocorrection inputs may contribute to correspondence ambiguities in the CMAP (216, FIG. 3). For example, the camera 102 may be mounted to the aircraft 100 at a fixed orientation (or according to a known camera model) and may capture images 208 from which 2D image features 208 may be detected (and from which orthocorrected features 306 may be derived) based on an orientation estimate 308 (e.g., estimates of relative pitch and roll angles determined by an inertial reference system (IRS) onboard the aircraft), the orthocorrected features 306a-b corresponding to constellation features 302a-c (e.g., runway approach lightbars 108).

In embodiments, errors in the orientation estimate 308 may contribute to feasible deviations of orthocorrected features 306a-b from their corresponding constellation features 302a-c. For example, the orientation estimate 308 may comprise a relative pitch estimate and a relative roll estimate. By way of a non-limiting example, the pitch estimate may be associated with a pitch error 68, e.g., the extent to which the pitch estimate deviates from the correct relative pitch of the aircraft 100. Accordingly, the orthocorrected features 306a-b associated with the constellation features 302a-c (e.g., three runway approach lightbars 108 in a spaced apart relationship along a ground distance L, relative to the constellation plane 124) may deviate from the constellation features by $\delta\theta$. Similarly, the orthocorrected features 306a and 306b of the orthoimage 306 may be associated with a distance L-$\delta$L between the apparent constellation features 302a and 302c; the constellation feature 302b may be associated with a missing image feature, e.g., a known runway approach lightbar 108 to which no detected image feature or orthocorrected feature corresponds.

Figure 5A:
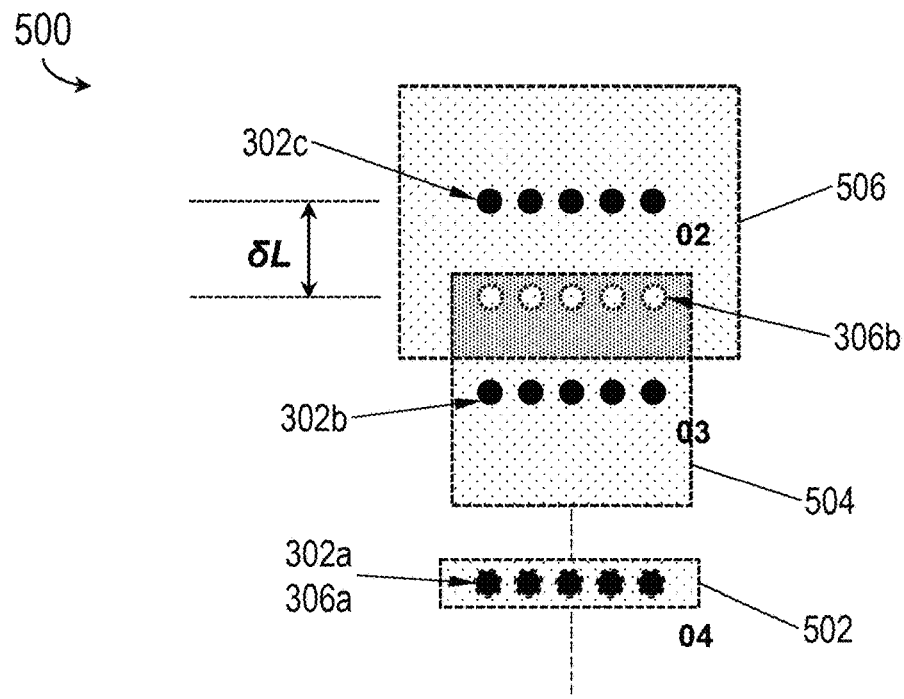
FIGS. 5A through 5D are diagrammatic illustrations of operations concerning correspondence ambiguities by the vision-based navigation system of FIG. 1.

Referring also to FIG. 5A, the orthoimage 500 associated with the orthocorrection transformation (304, FIG. 3) is shown.

In embodiments, a CMAP (216, FIG. 3) associated with the orthoimage 500 may be associated with correspondence ambiguities (e.g., ambiguous mappings of the 3D constellation features 302a-c to orthocorrected features 306a-b) if a feasible pitch error 68 is large enough that the feasible orthocorrect locations 502, 504, 506 (e.g., orthocorrect bounds) of multiple orthocorrected features 306a-b overlap. For example, the orthocorrected feature 306a and its feasible orthocorrect location 502 appears to correspond to the constellation feature 302a (e.g., the runway approach lightbar 04 (108, FIG. 4)) with negligible or no ambiguity. However, the orthocorrected feature 306b may be associated with two overlapping feasible orthocorrect locations 504, 506, such that the orthocorrected feature 306b may feasibly lie within the orthocorrect bound 504 (and correspond to the constellation feature 302b (runway approach lightbar 03)) or within the orthocorrect bound 506 (and correspond to the constellation feature 302c (runway approach lightbar 02)), but in either case the individual correspondence between the orthocorrected feature 306b and either constellation feature 302a-b may not be determinable to a sufficient level of confidence, resulting in a correspondence ambiguity between the orthocorrected feature 306b and the constellation features 302a-b.

In embodiments, the set of feasible orthocorrect locations 502, 504, 506 may correspond to the constellation features 302a-c to variable levels of confidence, e.g., based on error models (214, FIG. 2) in the orientation estimate (308, FIG. 3) and/or to auxiliary orthocorrection inputs (212, FIG. 2). For example, the feasible orthocorrect location 502 (e.g., and therefore the orthocorrected feature 306a) may correspond clearly and with high confidence to the constellation feature 302a, e.g., the runway approach lightbar 04 (108, FIG. 1), or the lightbar closest to the aircraft 100 (see, e.g., FIG. 3). Similarly, in embodiments the orthocorrected feature 306b may correspond to either of two feasible orthocorrect locations 504, 506. For example, the feasible orthocorrect location 506 may deviate from the actual constellation feature 302c (corresponding to the runway approach lightbar 02) by a distance $\delta$L based on the pitch error $\delta\theta$. For example, if the distance $\delta$L is large enough, the feasible orthocorrect location 506 may overlap with the feasible orthocorrect location 504, such that the orthocorrected feature 306b lies within both feasible orthocorrect locations 504 and 506. Accordingly, the orthocorrected feature 306b may ambiguously correspond to either the constellation feature 302b (runway approach lightbar 03) or to the constellation feature 302c (runway approach lightbar 02).

In embodiments, bounding any errors in the orientation estimate 308 or in auxiliary orthocorrection inputs 212 (based on error models 214 associated with the auxiliary orthocorrection inputs) may provide for the detection of correspondence ambiguities and the determination of all feasible correspondences (e.g., including correspondences that, while unlikely or improbable, may still be valid and possible, and therefore should not be dismissed). For example, feasible deviations may include orientation errors (e.g., pitch error 68, roll error, yaw error); extrinsic pose errors (e.g., based on error models 214 associated with the pose of the camera 102 or with other auxiliary sensors of the aircraft 100, in the platform frame); and/or pixel errors related to the image features 302a-b detected in the orthoimage 306. In some embodiments, a CMAP 216 may be based at least in part on an assumption of planarity among the constellation features 302a-c. For example, the runway features may be assumed to be on a level plane, with little or no deviation therefrom. In embodiments, known variations in planarity among the constellation features 302a-c may be accounted for in orthocorrection error bounding (orthocorrection estimate 310, FIG. 3). For example, the orthocorrection estimate 310 may require a bound on the depth of the orthocorrected features 306 derived from the original images captured by the camera 102.

Figure 5B:
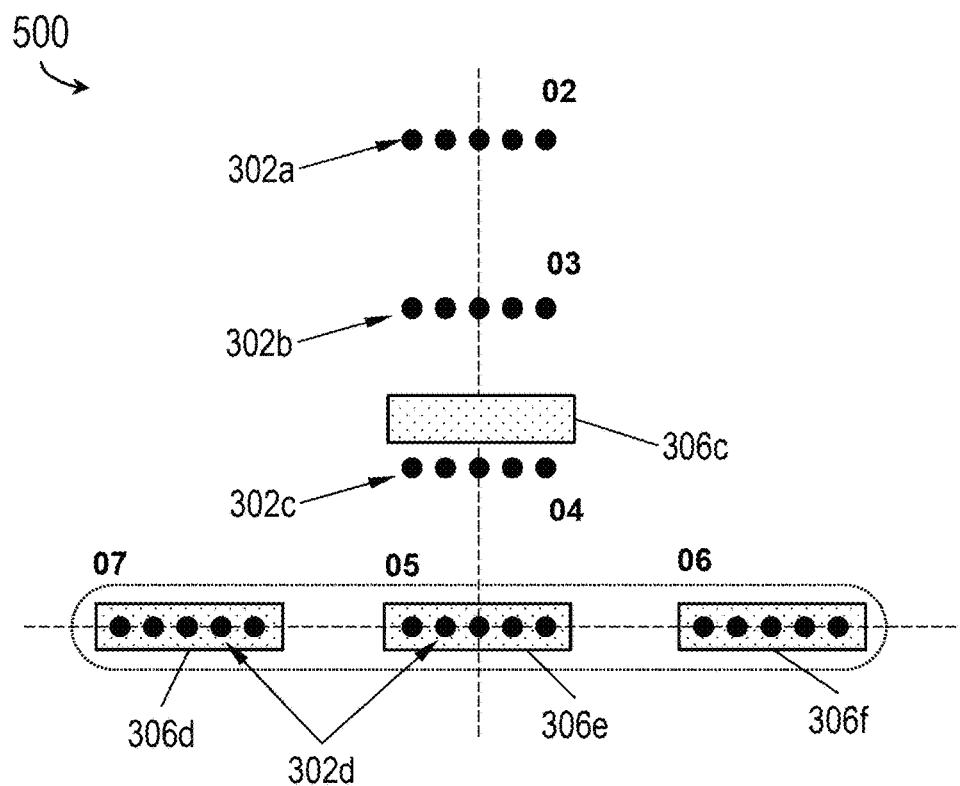

Referring also to FIG. 5B, the orthoimage 500 is shown. In embodiments, constellation features 302a-d may correspond to the ideal or feasible locations of orthocorrected features 306c-f. For example, the orthocorrected features 306d-f may respectively align with high confidence to the constellation feature 302d (which corresponds to runway approach lightbars 05, 06, 07 (108, FIG. 1) of a runway approach crossbar (110, FIG. 1)). However, the orthocorrected feature 306c may feasibly lie between the constellation features 302b and 302c (corresponding to runway approach lightbars 03/04 (108)), such that whether the orthocorrected feature 306c corresponds to lightbar 03 or to lightbar 04 cannot be determined to the desired confidence level, resulting in a correspondence ambiguity. In embodiments, the orthocorrected feature 306c may be proximate to the constellation feature 302c corresponding to runway approach lightbar 04 (108), and thus it may be more likely that the orthocorrected feature 306c corresponds to the constellation feature 302c and to lightbar 04.

In embodiments, the correspondence between the orthocorrected feature 306c and the constellation feature 302a corresponding to runway approach lightbar 02 (108) may be dismissed as negligible or infeasible. However, it may remain feasible (e.g., probable above an allowable or allocated threshold) that the orthocorrected feature 306c corresponds instead to the constellation feature 302b and to runway approach lightbar 03 (rather than to the constellation feature 302c and to lightbar 04). While the correspondence between the orthocorrected feature 306c and the constellation feature 302b remains feasible (even if it is highly unlikely), this correspondence cannot be dismissed outright at the risk of throwing out a valid correspondence (leading to an unacceptable failure rate of system integrity), and the correspondence ambiguity must be accounted for in the determination of a CMAP (216, FIG. 2) and associated candidate optical pose estimate (220, FIG. 2).

In embodiments, when a candidate CMAP 216 includes correspondence ambiguities, the vision-based navigation system (200, FIG. 2) may either limit the image region from which orthocorrected features (306, FIG. 3) are detected and derived (e.g., to exclude any detected correspondence ambiguities from the CMAP) or, if exclusion of ambiguities is not a viable option, account for the detected correspondence ambiguities in the CMAP and candidate optical pose estimate 220. For example, as described in related patent application Ser. No. 17/685,032, which application is herein incorporated by reference in its entirety, it may be possible to error bound with sufficiently high confidence multiple feasible correspondences and associated candidate optical pose estimates.

In some embodiments, an orthocorrection transformation (304, FIG. 3) may be repeated to refine the CMAP 216 and/or candidate optical pose estimate 220 using an orientation estimate (308, FIG. 3) and its covariance, projecting a prior candidate pose estimate 220 (e.g., based on a prior orthocorrection transformation) forward in time. In some embodiments, a candidate CMAP 216 and associated candidate optical pose estimate 220 may be refined using a reprojection error model. For example, based on 2D images captured by the camera 102, an initial orthocorrection transformation 304 may be performed based on an initial orientation estimate 308 of the aircraft (100, FIG. 1). Based on the initial orthocorrection transformation 304, a candidate CMAP 216, candidate 6DoF pose estimate 220, and error bounds 222 on the pose estimate, may all be determined (e.g., as shown by FIGS. 2-3). If, for example, a subsequent optical pose of the camera 102 results in an orientation estimate 308 with tighter error bounds (e.g., compared to the initial orientation estimate), the subsequent orientation estimate may be used in a subsequent orthocorrection transformation 304 with tighter feasible orthocorrection locations (502-506, FIG. 5A), which may provide for a subsequent CMAP 216 that eliminates correspondence ambiguities. The subsequent CMAP 216 may in turn be used to generate a subsequent candidate pose estimate 220 capable of incorporating more orthocorrected features 306 over a larger image area with fewer correspondence ambiguities. In embodiments, this refinement process may be iteratively continued, e.g., until a desired accuracy of the candidate CMAP 216 and/or candidate pose estimate 220 is achieved, or until iterations no longer significantly improve accuracy.

In some embodiments, the initial CMAP 216 and candidate pose estimate 220 may instead be refined via reprojection of the constellation features (302, FIG. 3) into the image plane (122, FIG. 1) based on the (6DoF) pose estimate, as described in greater detail below. For example, reprojection error modeling may be used to identify and eliminate ambiguities not provided for by the initial candidate CMAP 216. Further, refinement by reprojection as opposed to orthocorrection may have the added advantages of reduced ambiguity (e.g., associated with the 6DoF error model (222, FIG. 2) of the candidate pose estimate 220) and no planarity requirement of constellation features 302.

In embodiments, for a given error in the orientation estimate (308, FIG. 3), e.g., a bound on pitch error (68, FIG. 4), depth variation within the corresponding orthoimage 500 may be small over a subset region, but may increase over larger image regions. For example, smaller patterns may be more accurately approximated by a similarity transform while over larger image regions the feasible orthocorrection bounds (502-506, FIG. 5A) increase, which may in turn increase the possibility and/or number of feasible correspondences (and, therefore, correspondence ambiguities) in the candidate CMAP 216.

In some embodiments, the orthocorrection transformation (304, FIG. 3) and comparison of orthocorrected features 306 to constellation features 302 may be performed over a limited image region, e.g., until a predetermined ambiguity level is reached. For example, candidate pose estimates may be solved for (218, FIG. 2) based on the resulting candidate CMAPs 216. In some embodiments, the resulting candidate pose estimates (220, FIG. 2), e.g., 6DoF pose solutions, may be associated with tighter error bounds (222, FIG. 2), which may be used for improved subsequent orthocorrection transformations 304 over a larger image area with reduced ambiguity, as described above. For example, orthocorrection transformations 304 may continue iteratively until predetermined termination criteria are met, e.g., a set number of iterations, a desired level of accuracy or confidence, an allowable ambiguity level, and/or further improvement being negligible or impossible.

Figure 5D:
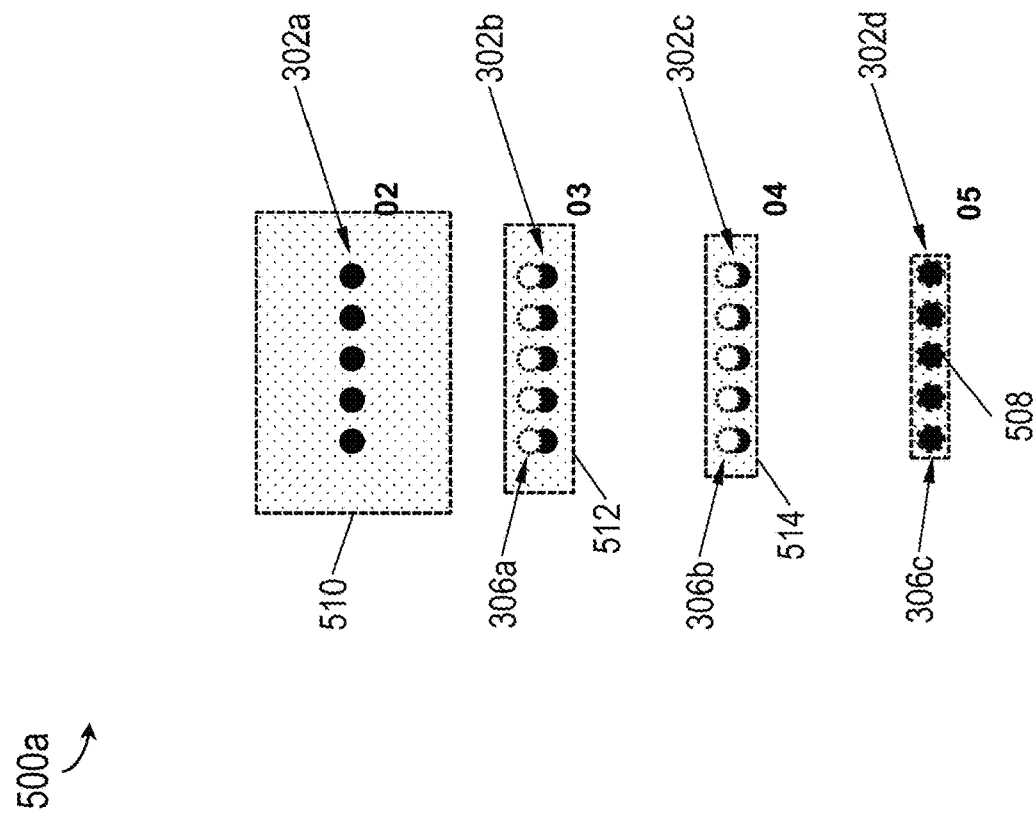
Figure 5C:
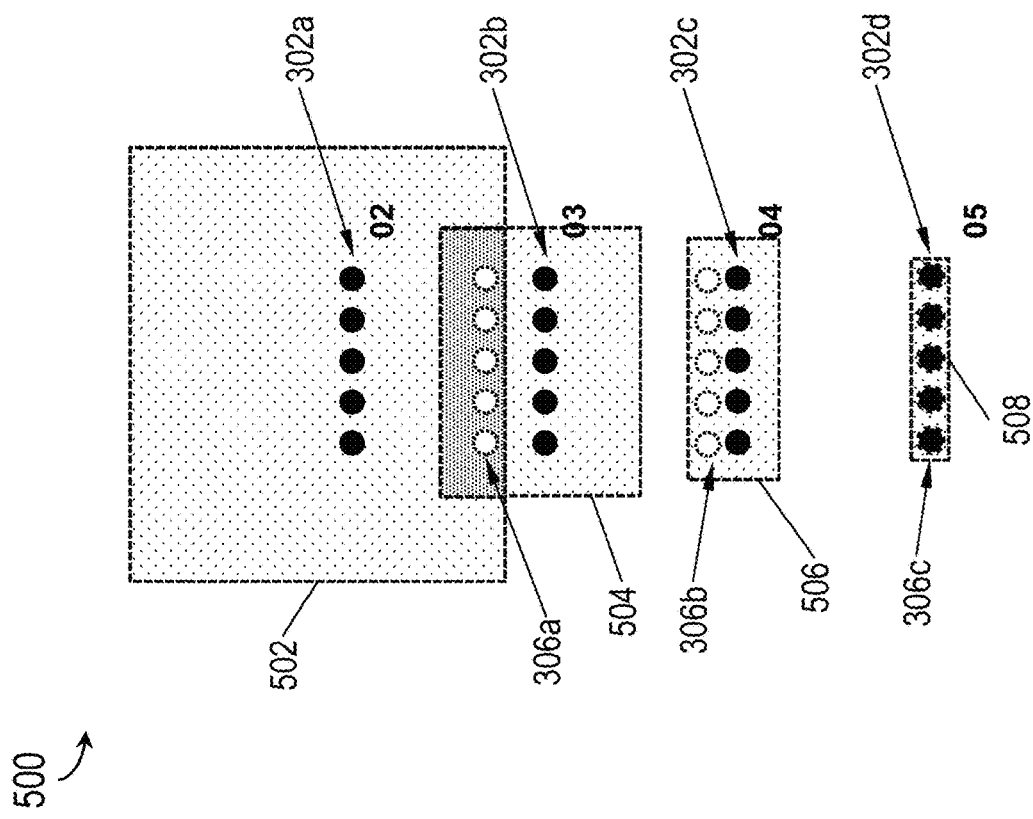

Referring now to FIG. 5C, an orthoimage 500 is shown.

In embodiments, the vision-based navigation system (200, FIG. 2) may attempt to resolve correspondence ambiguities in candidate CMAPs (216, FIG. 2) via intermediate pose estimation (218, FIG. 2) and iterative growth of image regions, e.g., portions of 2D images captured by the camera (102, FIG. 1) or portions of orthoimages 500 corresponding thereto. For example, the orthoimage 500 may be associated with a runway environment (104, FIG. 1) including runway approach lightbars 02, 03, 04, 05 (108, FIG. 1), corresponding to constellation features 302a-d. The orthoimage 500 may include detected orthocorrected features 306a, 306b, 306c respectively associated with feasible orthocorrection bounds 502/504, 506, and 508. As shown by FIG. 5A, the correspondences between the orthocorrected feature 306c and the constellation feature 302d, and between the orthocorrected feature 306b and the constellation feature 302c, may be unambiguous. However, the orthocorrected feature 306a may be associated with feasible orthocorrection bound 504 (associated with a correspondence to the constellation feature 302b) and simultaneously with feasible orthocorrection bound 502 (associated with a correspondence to the constellation feature 302a).

In embodiments, the correspondence ambiguity between the orthocorrected feature 306a and the constellation features 302a-b may be resolved by the vision-based navigation system 200 based on the unambiguous correspondences between the orthocorrected features 306b-c and respective constellation features 302c-d. For example, the latter two unambiguous correspondences may be used for a subsequent optical pose estimate (218) also incorporating a subsequent orientation estimate (308, FIG. 3) of the aircraft (100, FIG. 1). Referring also to FIG. 5D, if the error bound on the subsequent orientation estimate 308 is tighter for this subsequent optical pose estimate 218, a subsequent orthocorrection transformation (304, FIG. 3) may be performed based on the subsequent orientation estimate, resulting in an orthoimage 500a incorporating tighter feasible orthocorrection bounds 510, 512, 514. In embodiments, if the latter feasible orthocorrection bound 512 associated with the orthocorrected feature 306a no longer overlaps with the feasible orthocorrection bound 510 (e.g., associated with the constellation feature 302a), the orthocorrected feature 306a may then unambiguously correspond to the constellation feature 302b, resolving the correspondence ambiguity. For example, the vision-based navigation system 200 may perform another subsequent optical pose estimation 218 based on three unambiguous correspondences (e.g., 306a-302b, 306b-302c, 306c-302d) and including still tighter error bounding due to the reduced ambiguity. In embodiments, such subsequent optical pose estimations 218 with tighter error bounding may be used by the vision-based navigation system 200 for subsequent orthocorrection transformations 304 based on improved orientation estimates 308, or over larger portions or regions of the image, on an iterative basis until no additional orthocorrected features (306, FIG. 3) remain to be added to the candidate CMAP 216, or until orientation no longer significantly improves.

Figure 6:
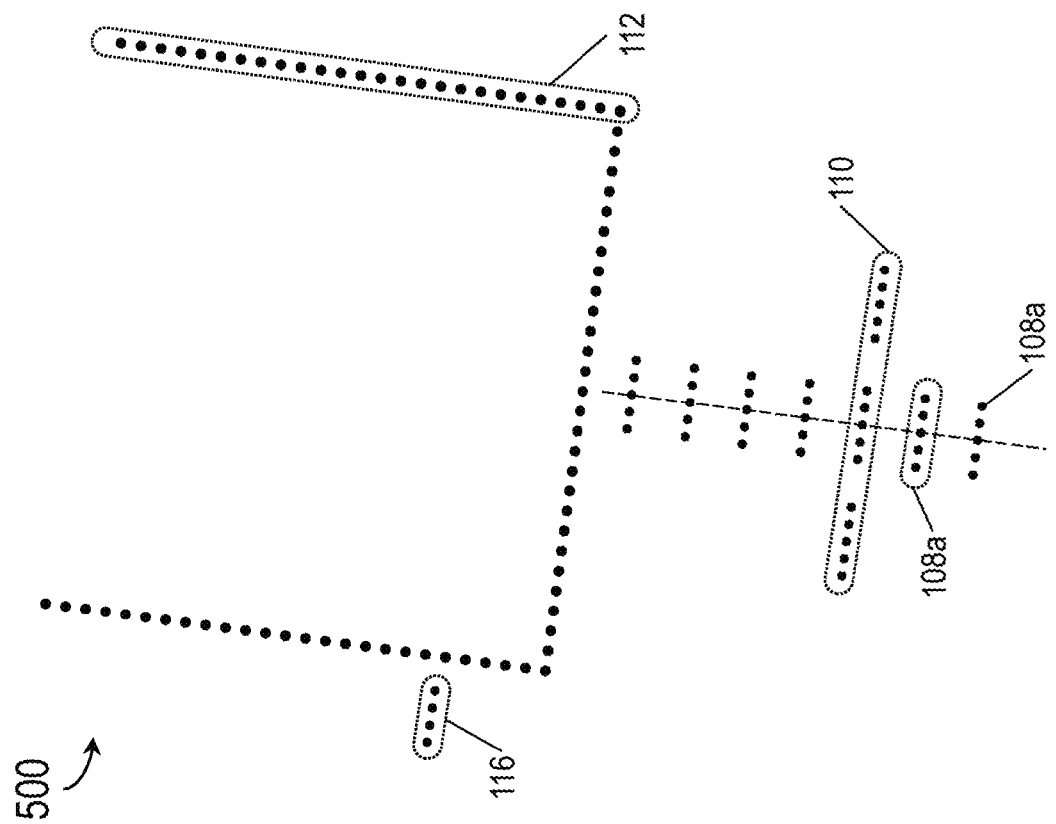
FIG. 6 is a diagrammatic illustration of invariants between raw images captured by, and orthoimages generated by, the vision-based navigation system of FIG. 1.
Figure 6:
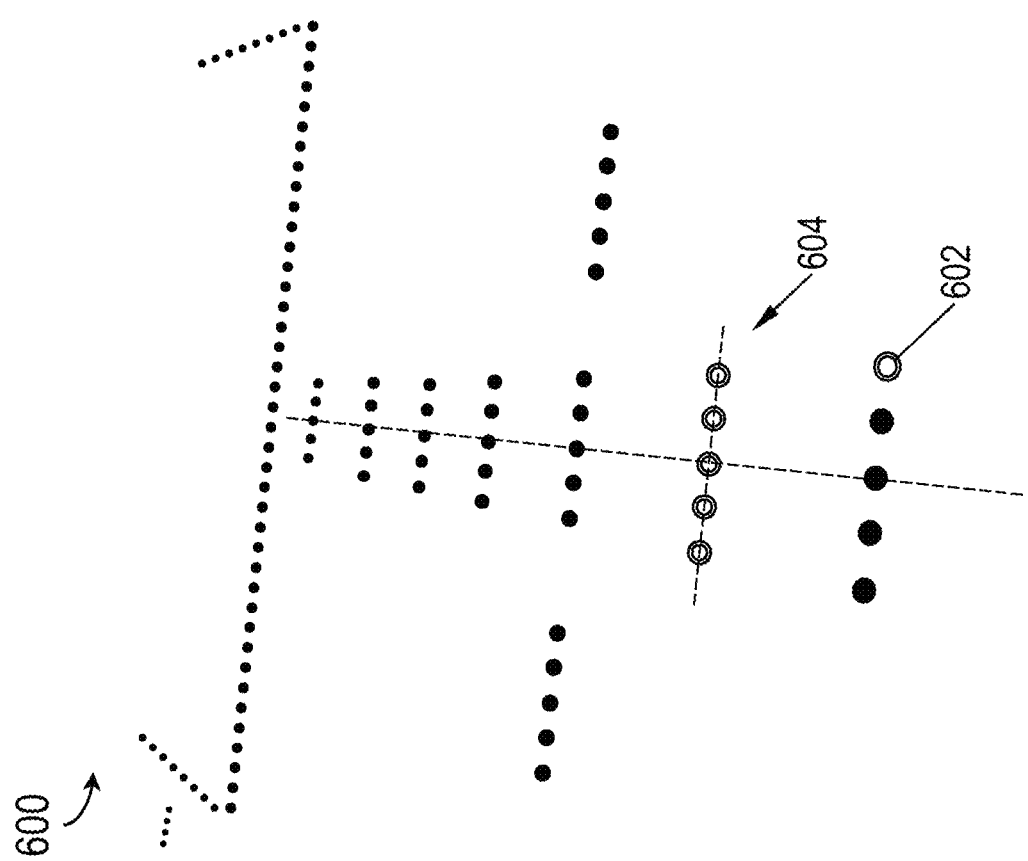

Referring to FIG. 6, a 2D image 600 captured by the camera (102, FIG. 1) and corresponding orthoimage 500 are shown.

In embodiments, image processing and feature detection (208, FIG. 2) may detect point features 602 within the image 600, e.g., corresponding to light and dark areas within the image (where light pixels or pixel groupings may be indicative of individual runway lighting elements (108a, FIG. 1)). Further, point features 602 may be detected in linear alignments 604, e.g., associated with edges, corners, and/or vertices. For example, linear alignments 604 may be invariant with respect to the image 600, in that runway approach lightbars 108, runway approach crossbars 110, runway edge lighting 112, indicator lighting 116, and any other real-world linear arrangements of individual runway lighting elements 108a may be preserved in the image as well. However, depth variations within the image 600 (e.g., with respect to runway edge lighting 112 in the background as opposed to runway approach lightbars 108 in the foreground) may complicate the detection (208) of 2D image features.

In embodiments, the orthocorrection transformation (304, FIG. 3) and resulting orthoimage 500 may attempt to normalize depth variations throughout the image 600 such that additional aspects may be invariant with respect to the orthoimage, e.g., relative scale and angles. For example, the relative scale of runway approach lighting 108 and runway approach crossbars 110 to runway edge lighting 112, and the angles between runway edge lighting at the rear and on either side of the runway, are preserved in the orthoimage 500. In embodiments, the normalization of depth variations in the orthoimage 500, and the alignment of the image plane (122, FIG. 1) to the constellation plane (124, FIG. 1) based on an approximate similarity transform, may allow for a more precise comparison of orthocorrected features (306, FIG. 3) to the corresponding constellation features (302, FIG. 3), all of which are associated with nominal 3D positions in the constellation plane. For example, more precise pattern detection tolerances may reduce the possibility of correspondence ambiguities in the candidate CMAP (216, FIG. 2) and associated candidate optical pose estimate (220, FIG. 2) generated by comparing the orthocorrected features 306 to the corresponding constellation features 302.

Figure 7A:
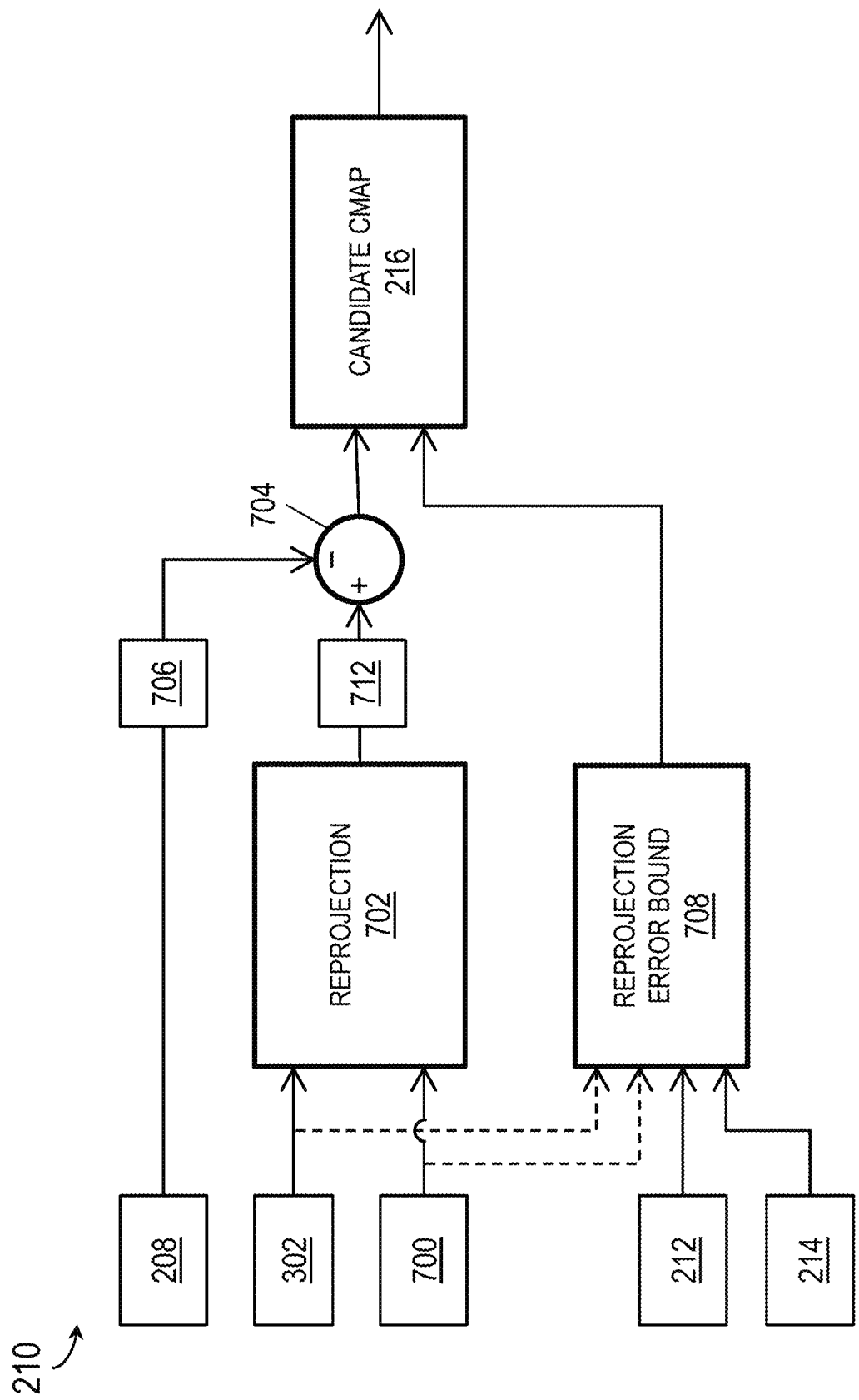
FIG. 7A is a block diagram of the vision-based navigation system of FIG. 1 determining a set of candidate correspondences via reprojection of constellation features to align with an image plane.
Figure 7B:
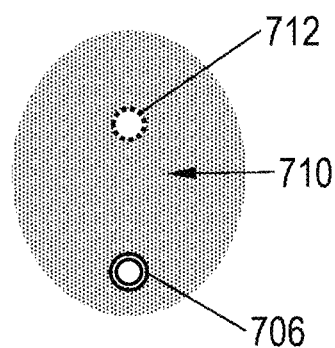
FIGS. 7B through 7E are diagrammatic illustrations of reprojection error covariances in the vision-based navigation system of FIG. 1.
Figure 7C:
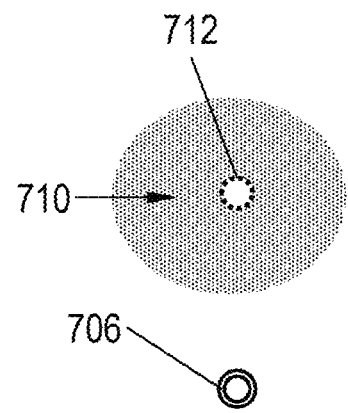

Referring to FIG. 7A, the candidate correspondence determination modules 210 of the vision-based navigation system (200, FIG. 2) are shown.

In some embodiments (e.g., if the orthocorrection transformation (304, FIG. 3) does not provide sufficiently precise orthocorrected features (306, FIG. 3) due to sufficiently non-planar constellation features 302 or prohibitively large errors in the orientation estimate (308, FIG. 3) correlated with position errors associated with the aircraft (100, FIG. 1)), alignment of the image plane (122, FIG. 1) and constellation plane (124, FIG. 1) into a common domain, as well as candidate correspondence determination 210 and determination of the CMAP 216 and candidate pose estimate (220, FIG. 2), may be achieved via reprojection of the constellation features 302 from the constellation plane into the image plane. For example, given an optical pose estimate 700 of sufficient precision (e.g., an estimate of the pose of the camera (102, FIG. 1) relative to the constellation plane 124 in at least six degrees of freedom (6DoF)), the vision-based navigation system 200 may reproject (702) the constellation features 302 into the image plane 122 and compare (704) the reprojected constellation features to 2D image features 706 (e.g., FIG. 6: 602, 604) detected (via image processing/feature detection 208) in the images (600, FIG. 6) captured by the camera 102. In embodiments, the error bounds of the optical pose estimate 700 (along with any additional auxiliary reprojection inputs 212 (comparable to auxiliary orthocorrection inputs (212, FIG. 2)) and their associated error bounds 214) may be used for reprojection error bounding 708 to detect correspondence ambiguities in the resulting candidate CMAP 216.

Referring also to FIGS. 7B through 7E, feasible reprojection bounds 710 (e.g., error covariances, feasible reprojection locations) of reprojected constellation features 712 (e.g., reprojected into the image plane 122) are shown. In embodiments, referring in particular to FIG. 7B, a correspondence between a reprojected constellation feature 712 and a detected image feature 706 may be added to the candidate CMAP 216 if, for example, the detected image feature 706 lies within the feasible reprojection bound 710 of the reprojected constellation feature 712. However, referring also to FIG. 7C, the correspondence between the reprojected constellation feature 712 and the detected image feature 706 may not be added to the candidate CMAP 216 if the detected image feature lies outside the feasible reprojection bound 710.

Figure 7D:
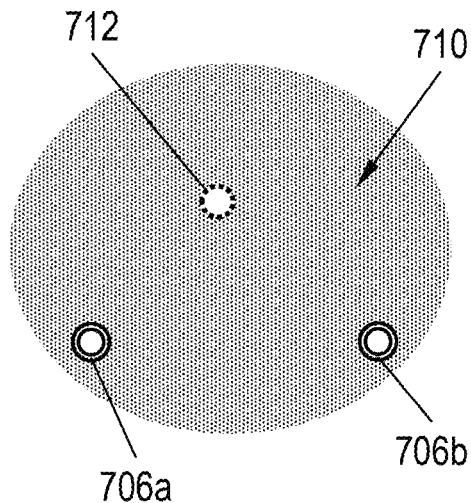
Figure 7E:
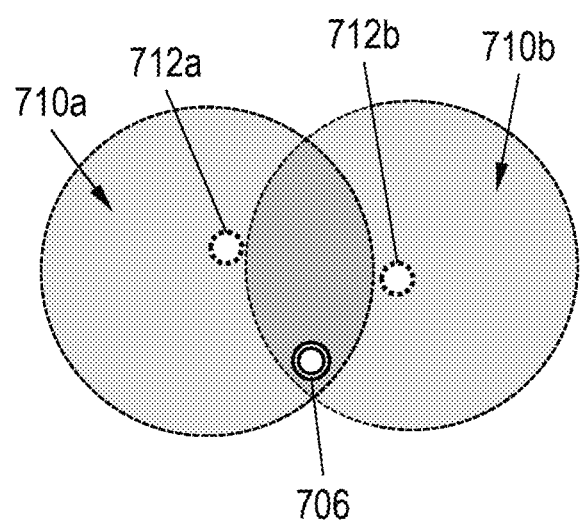

Referring in particular to FIGS. 7D and 7E, feasible reprojection bounds 710 may be used to identify correspondence ambiguities in the candidate CMAP 216. For example, referring to FIG. 7D, the feasible reprojection bounds 710 of the reprojected constellation feature 712 may incorporate two detected image features 706a, 706b. Alternatively, referring to FIG. 7E, the detected image feature 706 may lie within the feasible reprojection bounds 710a, 710b of two reprojected constellation features 712a, 712b. In either case, the correspondence ambiguity (e.g., does the reprojected constellation feature 712 correspond to the detected image feature 706a, to the detected image feature 706b, or to neither; does the detected image feature 706 correspond to the reprojected constellation feature 712a, to the reprojected constellation feature 712b, or to neither) may either be excluded (e.g., no correspondence is added to the CMAP 216) or accounted for (e.g., both correspondences are added to the candidate CMAP 216, and the correspondence ambiguity to be addressed by the vision-based navigation system 200).

Figure 8:
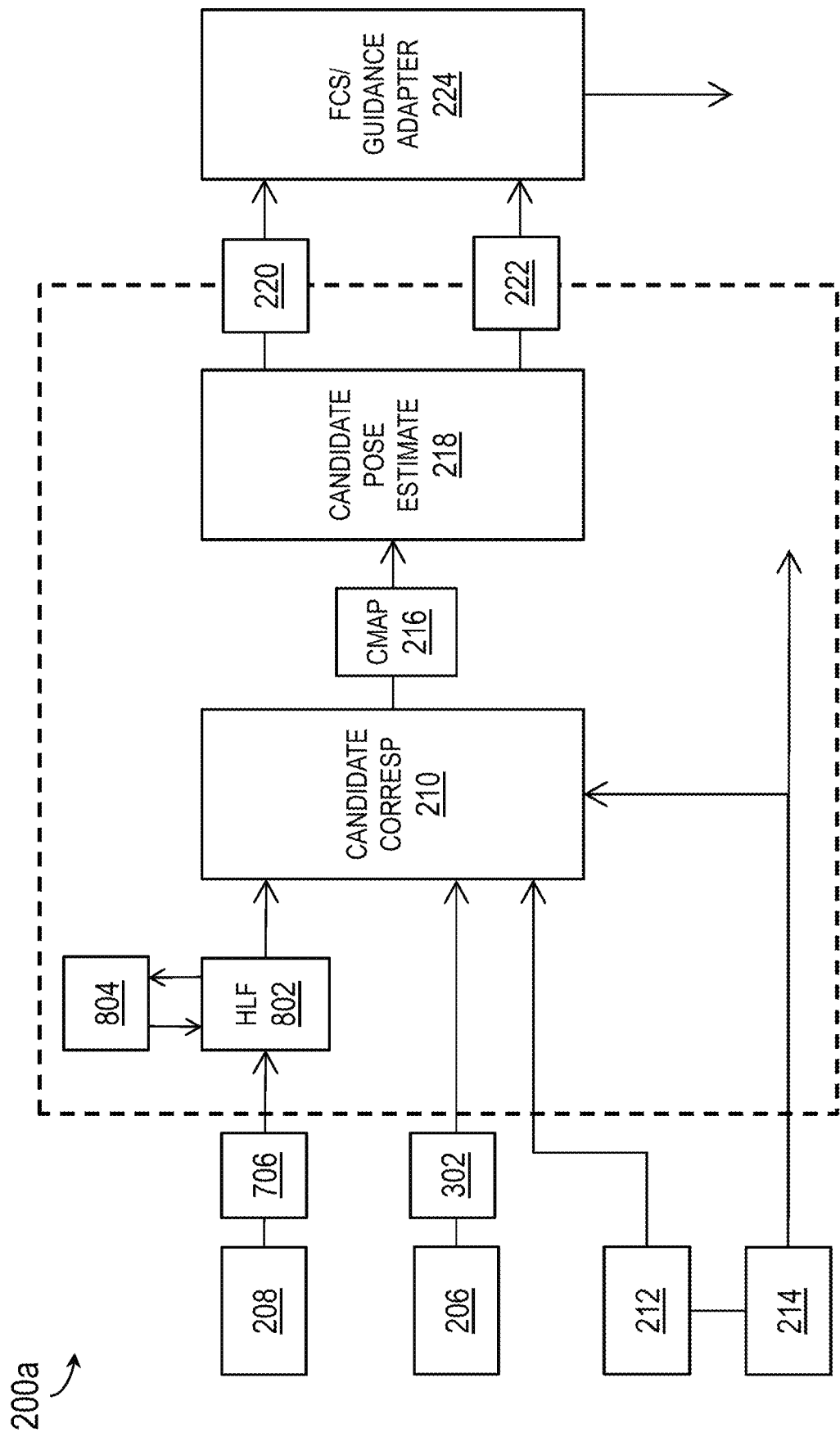
FIG. 8 is a block diagram of the vision-based navigation system of FIG. 1 further incorporating hierarchical detection of high-level features.

Referring now to FIG. 8, the vision-based navigation system 200a may be implemented and may function similarly to the vision-based navigation system 200 of FIG. 2, except that the vision-based navigation system 200a may incorporate hierarchical high-level feature (HLF) construction 802 based on lower-level features (LLF), e.g., image features 706, detected by image processing 208 within the 2D images (600, FIG. 6) captured by the camera (102, FIG. 1).

Conventional approaches to vision-based runway relative navigation may attempt to achieve a realistic high confidence image-to-world correspondence of image features 706 and constellation features 302 by attempting a large number of possible feature combinations and selecting a candidate combination with low residuals. Alternatively, vision-based navigation systems may learn and implement a complex black-box function based on a limited dataset. However, either approach, while providing high availability, precludes the computation of high-integrity error bounds 222 on candidate optical pose estimates 220 necessary for flight control systems (FCS), flight guidance systems, or other safety-critical application adapters 224.

In embodiments, image processing/feature detection 208 within the vision-based navigation system 200a may detect large numbers of LLF within raw images 600. For example, LLF may include very basic point features (602, FIG. 6) or linear arrangements (604, FIG. 6) thereof, which may not be significant enough for optimally efficient matching of image features 706 to constellation features 302. Further, image processing/feature detection 208 may detect spurious features (e.g., image features 706 that do not correspond to any constellation feature 302) and/or missing features (e.g., constellation features within the field of view or frustum (120, FIG. 1) of the camera 102, but which image processing fails to detect, such as the constellation feature (302b, FIG. 4)).

In embodiments, the vision-based navigation system 200a may address this issue by detecting LLF within the image 600 and constructing (802) from the detected LLF fewer and more complex HLF, each HLF carrying more distinct information content and structure than its component HLF or LLF. The orthocorrection transformation (304, FIG. 3) may then be performed based on a smaller set of more complex HLF. Similarly, the comparison (704, FIG. 7) of reprojected constellation features (712, FIG. 7A-E) may be with a smaller set of more complex HLF rather than a larger set of less detailed image features 706 or orthocorrections thereof (306, FIG. 3). For example, each HLF may comprise a set of components, wherein each component is an LLF or a lower-level HLF (which itself may be a less complex set of LLF and HLF), and a geometric relationship or pattern between each component of the set that defines the HLF. In embodiments, a set of fewer but denser HLFs may mean that fewer possible candidate correspondences must be considered when generating a candidate CMAP 216 (and associated candidate optical pose estimate 220) by matching the constellation features 302 to the set of HLFs. Additionally, the structural or geometric requirements of complex HLFs may assist in the detection of spurious or missed features (based, e.g., on where LLF or lower-level HLF should be located relative to a higher-level HLF) and may reduce both the likelihood, and the number of correspondence ambiguities within the candidate CMAP 216. In some embodiments, correspondence ambiguities may be further prevented or reduced by intermediate optical pose estimates 804 (e.g., intermediate pose solutions calculated on an iterative basis, as described above) while constructing progressively higher-level features from component LLFs and lower-level HLFs.

Figure 9:
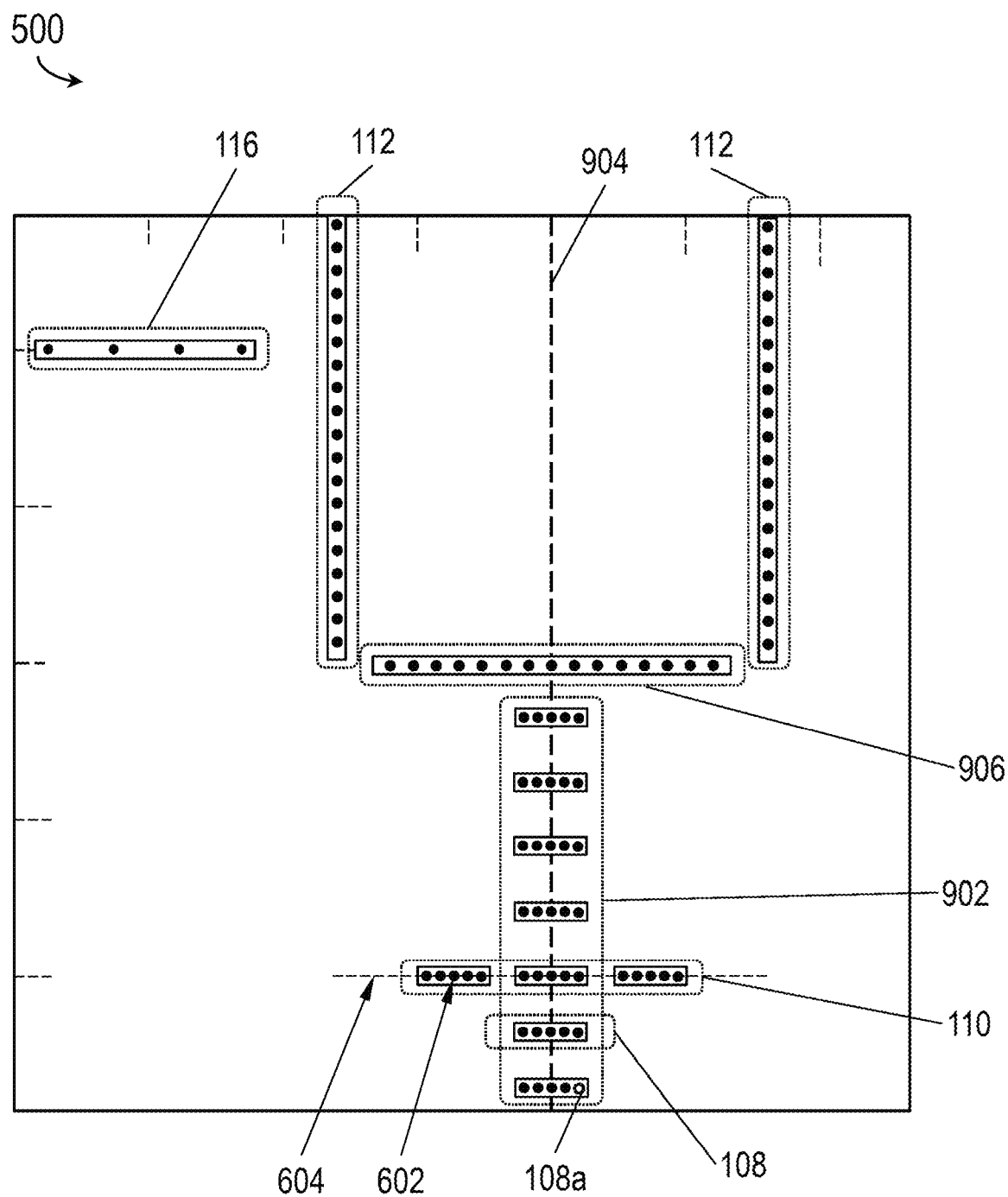
FIG. 9 is a diagrammatic illustration of hierarchical high-level feature detection operations of the vision-based navigation system of FIG. 8.

Referring now to FIG. 9, the orthoimage 500 and vision-based navigation system 200a are respectively shown.

In embodiments, the vision-based navigation system 200a of FIG. 8 may detect lower-level features (LLF) within the orthoimage, and detect or construct (802, FIG. 8) higher-level features (HLF), matching the higher-level or top-level HLFs to constellation features (302, FIG. 3) corresponding to runway features of the runway environment (108-116, FIG. 1). For example, individual runway approach lights 108a may be detected as single-point LLFs (602). In embodiments, as detected lines (604) remain projective invariant within the orthoimage 500, lines may be used to construct a HLF comprising a group of five (G5) evenly spaced individual runway approach lights 108a, the HLF corresponding to a runway approach lightbar 108. Similarly, in embodiments a group of three G5 HLFs (e.g., corresponding to runway approach lightbars 108) may be identified, each G5 group relatively spaced, as a higher-level HLF corresponding to a runway approach crossbar 110. A group of parallel G5 HLFs having endpoints at substantially the same positions may be identified as a set 902 of runway approach lightbars along the runway centerline 904.

In embodiments, other groupings of single point runway approach lights 108a (e.g., groups of more than five evenly spaced point lights; groups of four evenly spaced point lights without indication of a missing feature) may be identified, based on spacing, alignment, and proximity to other identified HLFs, as higher-level HLFs corresponding to left-side and right-side runway edge lighting 112, runway threshold lighting 906, and runway indicator lighting 116 (e.g., a group of four evenly spaced individual runway approach lights 108a (G4) may correspond to PAPI lighting). Based on the correspondences between higher-level HLFs and constellation features 302, candidate CMAPs (216, FIG. 8) may be generated and associated optical poses may be estimated (220, FIG. 8) and solved for.

Figure 10:
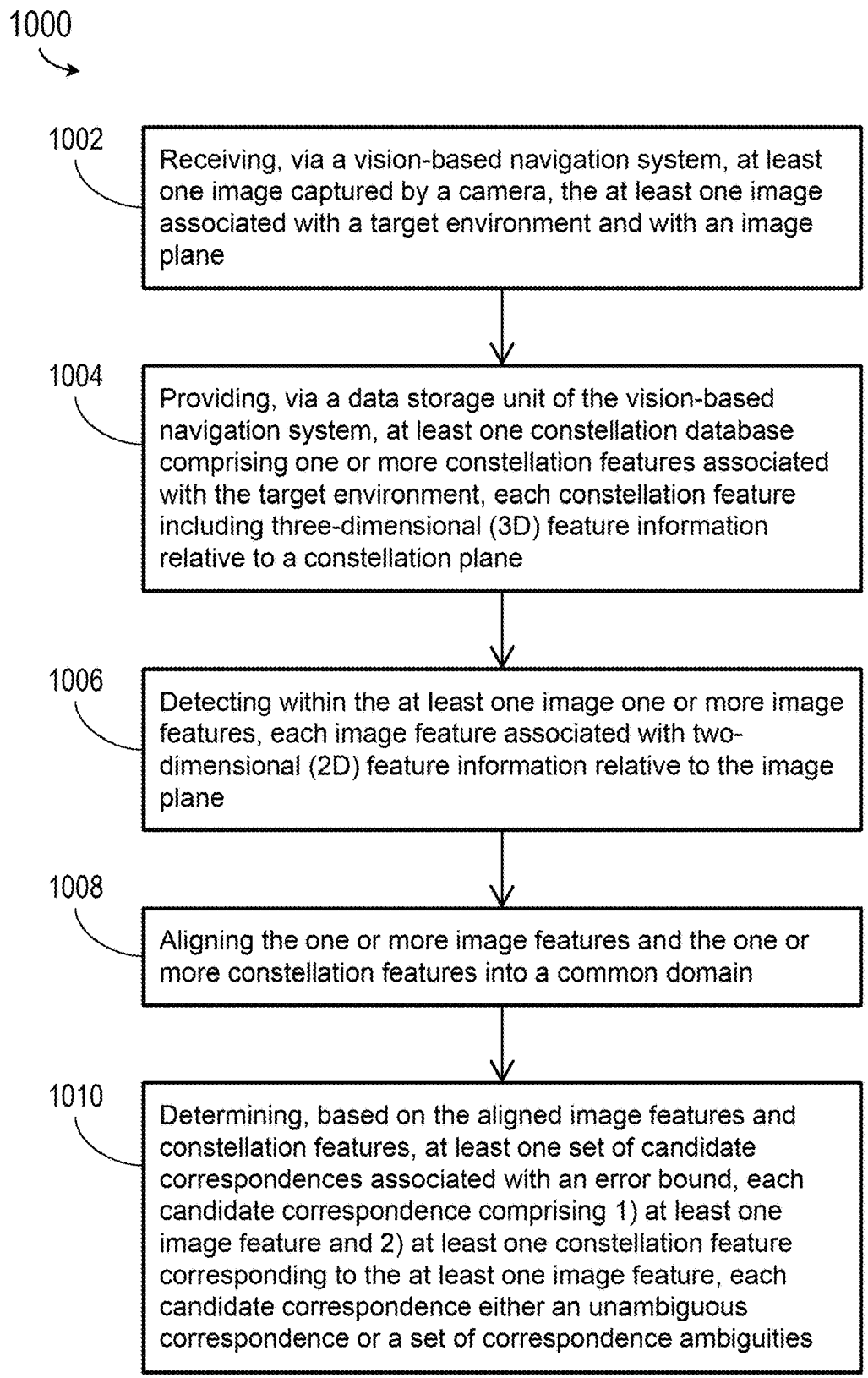
FIG. 10 is a flow diagram illustrating a method for high-confidence model-based correspondence determination according to example embodiments of this disclosure.

Referring now to FIG. 10, the method 1000 may be implemented by the vision-based navigational system 200, 200a and may incorporate the following steps.

At a step 1002, the vision-based navigational system receives two-dimensional (2D) images of a runway environment from a camera mounted aboard an aircraft (e.g., in a fixed orientation or according to a known camera model, the camera having a pose relative to the platform reference frame), the 2D images associated with an image plane.

At a step 1004, the vision-based navigation system provides (e.g., via memory or like data storage) a constellation database incorporating constellation features, e.g., runway lighting, runway markings, and other runway features associated with the runway and runway environment), each constellation feature associated with nominal three-dimensional (3D) position information relative to a constellation plane (e.g., constellation frame, earth reference frame).

At a step 1006, image processors of the vision-based navigation system detect image features depicted by the captured images, the image features corresponding to runway features or other elements of the runway environment and each image feature associated with 2D position information (e.g., x/y pixel locations) relative to the image plane. In some embodiments, the vision-based navigation system detects image features by detecting, via image processing, lower-level image features (LLF; e.g., points, lines, corners, vertices) and constructing a hierarchy of complex, high-content higher-level features (HLF), each HLF comprising a set of LLF and lower-level HLF and a geometric or spatial relationship defining the HLF.

At a step 1008, the vision-based navigation system aligns the image plane and the constellation plane into a common domain. For example, the vision-based navigation system may orthocorrect the detected image features into the constellation plane based on an orientation estimate (e.g., comprising a relative pitch angle and relative roll angle of the aircraft). Alternatively, or additionally, the vision-based navigation system may reproject constellation features into the image plane based on a pose estimate in at least six degrees of freedom (6DoF).

At a step 1010, the vision-based navigation system determines, based on the commonly aligned image features and constellation features, a candidate correspondence map (CMAP) comprising a set of candidate constellation features corresponding to each detected image feature to a desired confidence level. In some embodiments, the candidate CMAP includes ambiguous correspondences, e.g., correspondences that do not meet or exceed the desired confidence level and/or involve multiple feasible correspondences between image features and constellation features.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. An aircraft-based vision-based navigation system, comprising:
    at least one camera mounted to an aircraft and configured to capture at least one image associated with a target environment and with an image plane;
    at least one aircraft-based memory configured to store 1) processor-executable code and 2) at least one constellation database comprising one or more constellation features associated with the target environment, each constellation feature including three-dimensional (3D) feature information relative to a constellation plane; and
    at least one aircraft-based processor in communication with the camera and the memory, the at least one processor configured via the processor-executable code to:
        receive the at least one captured image;
        detect within the at least one captured image one or more image features, each image feature associated with two-dimensional (2D) feature information relative to the image plane;
        align the one or more image features and the one or more constellation features into a common domain based on 1) at least one orthocorrection input and 2) at least one error bound corresponding to the orthocorrection input;
        determine, based on the aligned image features and constellation features, at least one set of candidate correspondences, each candidate correspondence comprising:
            at least one image feature;
            and
            at least one constellation feature corresponding to the at least one image feature.

2. The vision-based navigation system of claim 1, wherein the at least one processor is configured to determine, based on the at least one set of candidate correspondences:
    at least one candidate pose estimate associated with a pose of the camera relative to the constellation plane.

3. The vision-based navigation system of claim 2, wherein:
    the at least one set of candidate correspondences is associated with a desired confidence level; and
    wherein the at least one set of candidate correspondences includes at least one ambiguous candidate correspondence below the desired confidence level.

4. The vision-based navigation system of claim 1, wherein:
    the at least one orthocorrection input includes at least one auxiliary input; and
    the at least one error bound is based on at least one of:
        a first error model associated with the one or more image features;
        a second error model associated with the one or more constellation features;
        an auxiliary error model corresponding to the at least one auxiliary input;
        or
        a prior estimate of the camera pose.

5. The vision-based navigation system of claim 4, wherein the at least one auxiliary input includes:
    a heading angle;
    a planarity corresponding to the one or more constellation features;
    a camera model corresponding to the camera;
    a feature pixel error associated with the one or more image features;
    or
    a sensor alignment model corresponding to a sensor in communication with the vision-based navigation system.

6. The vision-based navigation system of claim 1, wherein the at least one orthocorrection input includes:
    at least one orientation estimate received from an inertial reference system (IRS) in communication with the vision-based navigation system, the orientation estimate associated with an estimated orientation of the image plane relative to the constellation plane in at least two degrees of freedom; and
    wherein the at least one processor is configured to align the image plane to the constellation plane via at least one orthocorrection transformation of the one or more image features into the constellation plane based on the at least one orientation estimate.

7. The vision-based navigation system of claim 6, wherein the vision-based navigation system is embodied in an aircraft and the at least one orientation estimate comprises:
    an estimated pitch of the aircraft;
    an estimated roll of the aircraft; and
    a mounting orientation of the camera relative to the aircraft.

8. The vision-based navigation system of claim 1, wherein the at least one orthocorrection input includes:
    at least one pose estimate associated with a pose of the camera relative to the constellation plane, the at least one pose estimate received from an aircraft-based inertial reference system (IRU) in communication with the vision-based navigation system
and
wherein the at least one processor is configured to align the constellation plane to the image plane via at least one reprojection of the one or more constellation features into the image plane based on the at least one received pose estimate.

9. The vision-based navigation system of claim 1, wherein:
the at least one processor is configured to detect within the at least one captured image one or more image features by:
detecting, within at least one subset of the captured image, one or more lower-level image features;
and
determining, based on the one or more lower-level image features, one or more higher-level image features, each higher-image level feature comprising:
two or more components selected from a group including a lower-level image feature or a higher-level image feature;
and
at least one geometric relationship corresponding to the two or more components.

10. The vision-based navigation system of claim 9, wherein the at least one processor is configured for determining at least one intermediate pose estimate associated with the at least one geometric relationship.

11. A method for high-confidence model-based correspondence determination, the method comprising:
receiving, via an aircraft-based vision-based navigation system, at least one image captured by an aircraft-based camera, the at least one image associated with a target environment and with an image plane;
providing, via a data storage unit of the vision-based navigation system, at least one constellation database comprising one or more constellation features associated with the target environment, each constellation feature including three-dimensional (3D) feature information relative to a constellation plane;
detecting within the at least one image one or more image features, each image feature associated with two-dimensional (2D) feature information relative to the image plane;
aligning the one or more image features and the one or more constellation features into a common domain based on 1) at least one orthocorrection input and 2) at least one error bound corresponding to the orthocorrection input;
and
determining, based on the aligned image features and constellation features, at least one set of candidate correspondences each candidate correspondence comprising 1) at least one image feature and 2) at least one constellation feature corresponding to the at least one image feature.

12. The method of claim 11, wherein detecting within the at least one image one or more image features includes:
detecting, within at least one subset of the at least one image, one or more lower-level image features;
and
determining, based on the one or more lower-level image features, one or more higher-level image features, each higher-image level feature comprising:
two or more components selected from a group including a lower-level image feature or a higher-level image feature;
and
at least one geometric relationship corresponding to the two or more components.

13. The method of claim 12, further comprising:
determining at least one intermediate pose estimate associated with the at least one geometric relationship.

14. The method of claim 11, wherein aligning the one or more image features and the one or more constellation features into a common domain based on 1) at least one orthocorrection input and 2) at least one error bound corresponding to the orthocorrection input includes:
receiving, from an inertial reference system (IRS) in communication with the vision-based navigation system, at least one estimated aircraft orientation;
and
based on the at least one estimated aircraft orientation, orthocorrecting the one or more image features into the constellation plane via at least one orthocorrection transformation.

15. The method of claim 11, wherein aligning the one or more image features and the one or more constellation features into a common domain based on 1) at least one orthocorrection input and 2) at least one error bound corresponding to the orthocorrection input includes:
receiving, from at least one IRS in communication with the vision-based navigation system, at least one pose estimate associated with a pose of the camera relative to the constellation plane;
and
reprojecting the one or more constellation features into the image plane based on the at least one received pose estimate.

16. The method of claim 11, wherein determining, based on the aligned image features and constellation features, at least one set of candidate correspondences includes:
determining at least one set of candidate correspondences associated with a desired confidence level, wherein the at least one unambiguous correspondence either meets or exceeds the desired confidence level and the at least one ambiguous correspondence fails to meet the desired confidence level.

17. The method of claim 11, further comprising:
determining, based on the at least one set of candidate correspondences, at least one candidate pose estimate associated with a pose of the camera relative to the constellation plane.

18. The method of claim 11, wherein aligning the one or more image features and the one or more constellation features into a common domain based on 1) at least one orthocorrection input and 2) at least one error bound corresponding to the orthocorrection input includes:
aligning the one or more image features and the one or more constellation features into a common domain based on at least one auxiliary input, the auxiliary input including at least one of:
a heading angle;
a planarity corresponding to the one or more constellation features;
a camera model corresponding to the camera;
a feature pixel error associated with the one or more image features;
or a sensor alignment model corresponding to a sensor in communication with the vision-based navigation system.

\* \* \* \* \*